United States Patent [19]
Hagen

[11] Patent Number: 5,923,499
[45] Date of Patent: Jul. 13, 1999

[54] AIR BEARING SLIDER HAVING SHAPED AIR BEARING SURFACE EXTENDING PORTION LOCATED ON CENTRAL AXIS

[75] Inventor: Tracy M. Hagen, Edina, Minn.

[73] Assignee: Seagate Technology, Inc., Scotts Valley, Calif.

[21] Appl. No.: 08/904,328

[22] Filed: Jul. 31, 1997

Related U.S. Application Data

[62] Division of application No. 08/584,731, Jan. 11, 1996., Pat. No. 5,654,853, which is a continuation of application No. 08/192,116, Feb. 4, 1994., abandoned

[51] Int. Cl.⁶ .................................................. G11B 21/21
[52] U.S. Cl. ............................................................ 360/103
[58] Field of Search ..................................... 360/102–103

[56] References Cited

U.S. PATENT DOCUMENTS

| | | | |
|---|---|---|---|
| 3,823,416 | 7/1974 | Warner | 360/112 |
| 3,855,625 | 12/1974 | Garnier et al. | 360/103 |
| 4,034,412 | 7/1977 | Smith | 360/103 |
| 4,191,980 | 3/1980 | King et al. | 360/99 |
| 4,218,715 | 8/1980 | Garnier | 360/103 |
| 4,420,780 | 12/1983 | Deckert | 360/103 |
| 4,475,135 | 10/1984 | Warner et al. | 360/103 |
| 4,644,641 | 2/1987 | Verdone | 29/603 |
| 4,646,180 | 2/1987 | Ohtsubo | 360/103 |
| 4,670,806 | 6/1987 | Ghose | 360/103 |
| 4,673,996 | 6/1987 | White | 360/103 |
| 4,734,803 | 3/1988 | Nishihira | 360/103 |
| 4,802,042 | 1/1989 | Strom | 360/103 |
| 4,814,906 | 3/1989 | Suzuki et al. | 360/75 |
| 4,829,395 | 5/1989 | Coon et al. | 360/103 |
| 4,870,519 | 9/1989 | White | 360/103 |
| 4,910,621 | 3/1990 | Matsuda et al. | 360/104 |
| 4,961,121 | 10/1990 | Astheimer et al. | 360/103 |
| 4,984,114 | 1/1991 | Takeuchi et al. | 360/103 |
| 4,996,614 | 2/1991 | Okutsu | 360/103 |
| 5,019,930 | 5/1991 | Takeya | 360/103 |
| 5,062,017 | 10/1991 | Strom et al. | 360/103 |
| 5,068,759 | 11/1991 | Matsuzaki | 360/103 |
| 5,086,360 | 2/1992 | Smith et al. | 360/103 |
| 5,097,369 | 3/1992 | Matsuzaki | 360/103 |
| 5,097,370 | 3/1992 | Hsia | 360/103 |
| 5,126,901 | 6/1992 | Momoi et al. | 360/103 |
| 5,128,821 | 7/1992 | Takeuchi et al. | 360/103 |
| 5,128,822 | 7/1992 | Chapin et al. | 360/103 |
| 5,200,868 | 4/1993 | Chapin et al. | 360/103 |
| 5,287,235 | 2/1994 | Cunningham et al. | 360/103 |
| 5,309,303 | 5/1994 | Hsia et al. | 360/103 |
| 5,353,180 | 10/1994 | Murray | 360/103 |
| 5,430,591 | 7/1995 | Takeuchi et al. | 360/103 |
| 5,515,219 | 5/1996 | Ihrke et al. | 360/103 |

FOREIGN PATENT DOCUMENTS

| | | |
|---|---|---|
| 1-298585 | 12/1989 | Japan . |
| 2-53256 | 2/1990 | Japan . |

*Primary Examiner*—Brian E. Miller
*Attorney, Agent, or Firm*—Kinney & Lange, P.A.

[57] ABSTRACT

An air bearing slider for supporting a transducer proximate a rotating disc utilizes a raised air bearing surface that interacts with pressurized air to support the slider. The slider includes a slider body that has a leading edge and trailing edge relative to motion of the rotating disc. The air bearing surface has a leading edge portion proximate the leading edge of the slider body that is greater in width than a trailing edge portion positioned proximate and central with respect to the trailing edge of the slider body. The leading edge of the raised air bearing surface extends the entire width of the raised air bearing portion.

18 Claims, 11 Drawing Sheets

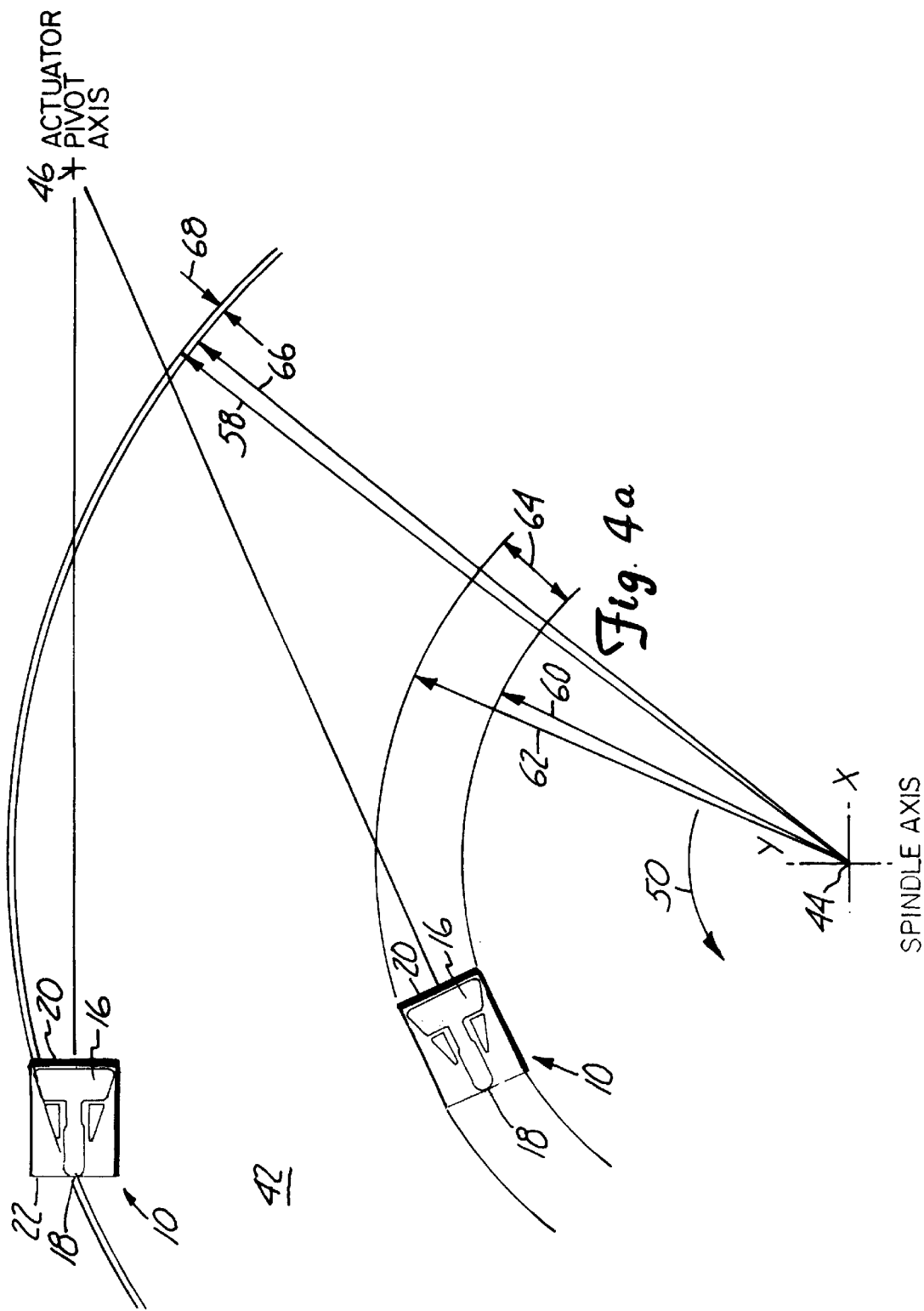

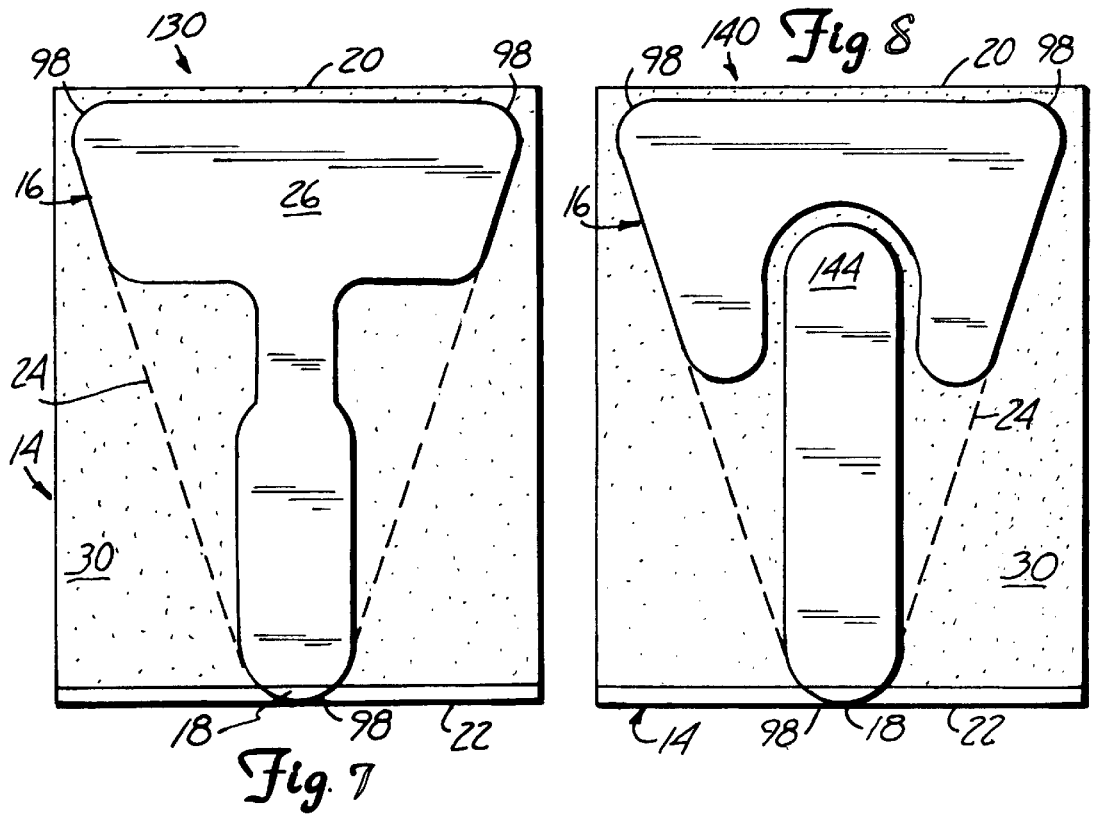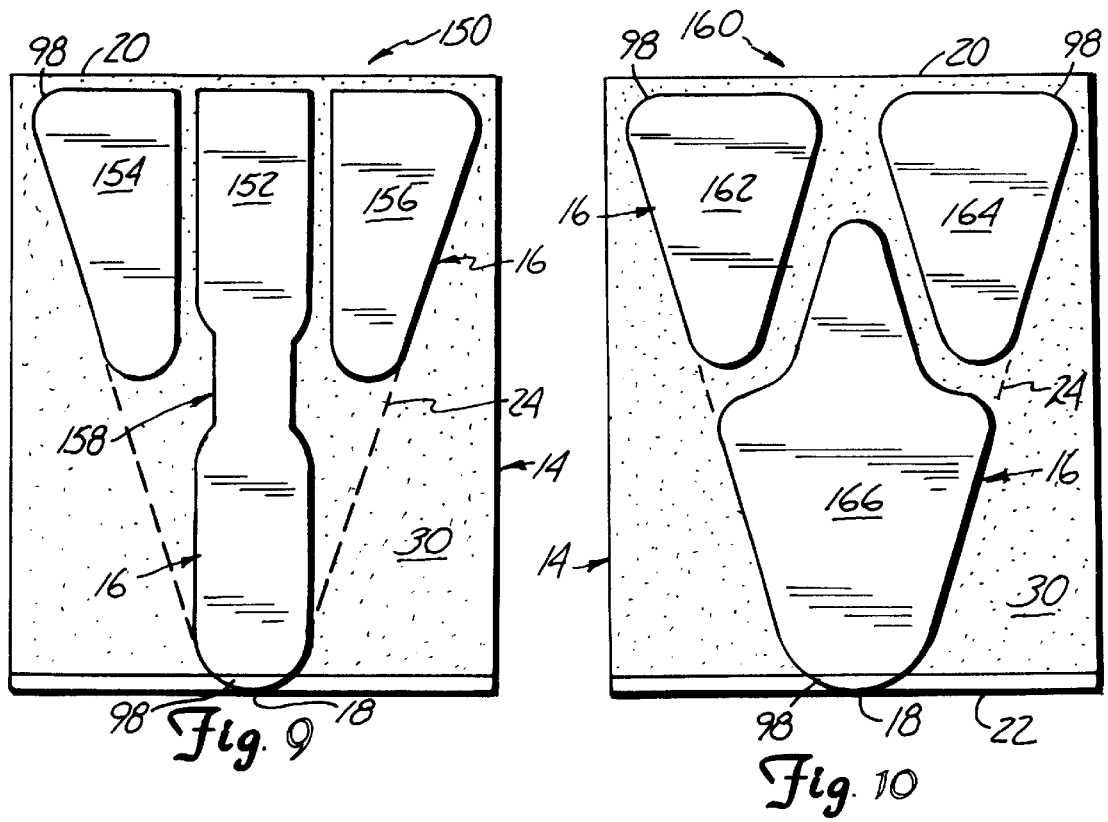

AIR BEARING SLIDER HAVING SHAPED AIR BEARING SURFACE EXTENDING PORTION LOCATED ON CENTRAL AXIS

This is a divisional of application Ser. No. 08/584,731, filed Jan. 10, 1996, U.S. Pat. No. 5,654,853 which was a file wrapper continuation of application Ser. No. 08/192,116, filed on Feb. 4, 1994 abandoned.

The present invention relates to a magnetic head slider assembly. More particularly, to a magnetic head slider which makes use of an air bearing surface that has a leading edge width that is greater than a trailing edge width for providing improved fly characteristics and disc utilization efficiency.

BACKGROUND OF THE INVENTION

Magnetic storage systems that make use of a magnetic head slider assembly are known and described, for example, in U.S. Pat. No. 5,062,017 to Storm et al., assigned to the assignee of the present invention and incorporated herein by reference. The magnetic head slider assembly includes a load beam, a slider, and a gimbal for attaching the slider to the load beam. The slider also includes a transducer for recording and retrieving information from the rotating magnetic disc as the slider is positioned proximate selected locations on the disc by an actuator.

The actuator includes a positioning arm. The slider assembly is mounted on the positioning arm. For the case of a rotary actuator, the positioning arm pivots about a pivot axis for positioning the slider assembly at any point along an arc extending from an inner radius to an outer radius of the disc surface. In the case of a linear actuator, the positioning arm moves in a linear direction to position the slider assembly at any point along a line extending from an inner radius to an outer radius of the disc surface.

The magnetic disc has a polished surface so that rotation of the magnetic disc causes movement of air relative to the slider producing a hydrodynamic lifting force or air bearing. This air bearing supports the slider proximate the rotating magnetic disc. The gimbal mounting between the slider and the load beam allows the slider to pitch and roll to more closely follow the topography of the disc surface. In this manner, the spacing variation between the transducer and disc surface can be maintained more closely.

To maximize the capacity of the disc storage device, the disc space should be efficiently utilized, however, portions of the disc are not suitable for data storage and retrieval resulting in inefficient utilization of disc space. A landing zone portion if often located toward an inner radius of the disc, referred to as an "inner flyable radius", is not suitable for data storage and retrieval. The landing zone portion is found in disc storage systems in which the slider engages the disc surface during starting and stopping which are frequently referred to as "contact start/stop" systems (CSS). When the disc storage device is powered down, the slider assembly lands or is in contact with the landing zone portion of the disc. To minimize torque on the disc spindle motor, thereby allowing the use of smaller, less expensive motors, the innermost disc surface or disc surface adjacent an "inner flyable radius" is used as the landing zone. The disc surface in the landing zone is damaged by slider contract during landings and takeoffs, thereby affecting the reliability of storage and retrieval of information. For these reasons, the landing zone portion of the disc is not suitable for data storage and retrieval resulting in disc inefficiency.

Another constraint on the utilization of the disc surface is the result of an offset frequently found between the outer edge of the air bearing surface and the transducer preventing the transducer from being positioned at the "outer flyable radius" of the disc surface. The outer flyable radius is that radius specified by the manufacturer over which the air bearing surface of the slider can fly without deleterious effects. Because of this offset the outermost position of the transducer or outermost radius of the recording zone is less than the outer flyable radius resulting a portion of the disc which is not accessible for data storage and retrieval. For this reason, a portion of the disc is not used for data storage and retrieval resulting in disc inefficiency.

In addition to efficient utilization of disc space to maximize data storage capacity, the disc storage device should be reliable. One factor which effects the reliability of the disc storage device is the susceptibility of the slider to collect contamination as it flies over the disc surface. Frequently, individual portions of contamination which by themselves may not be disruptive to the slider but when collected by the slider these individual pieces of contamination unite to form a larger contaminant. This larger contaminant, if dislodged from the slider, may then pass through the air bearing or space between the air bearing surface and the disc surface thereby scratching or damaging either the slider or the disc surface as the contaminant is passed. Furthermore, the passing of contamination through the air bearing disrupts the spacing between the slider and the disc surface. This disruption in the spacing may cause gradual damage to the disc surface or result in catastrophic failure known as "head crash." The gradual damage to the disc surface results from continual impacts between the transducer and the contaminant producing slight contacts with the disc surface which eventually can result in head crash.

There is a present need for air bearing sliders that make efficient utilization of the disc space between the inner flyable radius and the outer flyable radius. This air bearing slider should be designed to help prevent the collection of contaminants which can affect the reliability of the disc storage device. In addition, this air bearing slider should be symmetrical so that the same slider design may be used for either the top surface or bottom surface of the disc. The air bearing slider should be capable of lifting off quickly from the disc surface during disc start-up and fly with a high fly slope thereby reducing friction and wear. The air bearing slider should be insensitive to external forces and be capable of providing the desired fly height versus disc radius relationship. In addition, this air bearing slider should be well suited to the adhesive bonding process used to affix the flexure (or gimbal) to the slider body. Furthermore, this air bearing slider should be well suited to fly testing for easily and quickly determining the head disc separation. Finally, this air bearing slider should have a relatively simple geometry so that it can be easily simulated to determine performance characteristics.

SUMMARY OF THE INVENTION

The present invention is an air bearing slider for supporting a transducer proximate a rotating disc. The slider includes a slider body that has a leading edge and a trailing edge relative to the motion of the rotating disc. Also included is a raised portion on the slider body defining an air bearing surface that interacts with pressurized air to support the slider in close proximity to the rotating disc. The air bearing surface has a leading edge portion and a trailing edge portion. The leading edge portion is positioned proximate the leading edge of the slider body and has a leading edge width as measured tangential to the leading edge of the slider body. The trailing edge portion is positioned proximate and central with respect to the trailing edge of the slider body and has a trailing edge width as measured tangential to the trailing edge. The trailing edge width of the air bearing surface is less than that of the leading edge width of the air bearing surface. The raised air bearing surface extends the entire width of the leading edge portion of the air bearing surface.

Another aspect of the present invention is a rotating magnetic disc storage device for transferring signals representative of data between a transducer and a rotating magnetic disc. The device includes a slider that has a slider body having a leading edge and a trailing edge relative to motion of the rotating disc. The slider includes a raised portion on the slider body defining an air bearing surface that interacts with pressurized air to support the slider in close proximity to the rotating disc. The air bearing surface has a leading edge portion and a trailing portion with the leading edge of the air bearing surface having a width that is greater than that of a portion of the air bearing surface proximate the trailing edge of the slider body. Also included, is a pivotally mounted support arm coupled to the slider that is capable of pivoting between first and second positions for positioning the slider between an inner radius and an outer radius on the magnetic disc.

Yet another aspect of the present invention is an air bearing slider for supporting a transducer proximate a rotating disc. The slider includes a slider body having a leading edge and a trailing edge relative to motion of the rotating disc. The slider body includes a raised air bearing surface that has a leading edge portion extending at least partially along the leading edge of the slider body. The raised air bearing surface also includes a trailing edge portion positioned centrally proximate the trailing edge of the slider body and extending at least partially along a central axis between the trailing edge portion and the leading edge portion.

BRIEF DESCRIPTION OF THE DRAWINGS

FIG. 1b is a perspective view of a bottom surface of the air bearing slider of FIG. 1a.

FIG. 1d is a perspective view of the bottom trailing portion of the air bearing slider of FIG. 1a.

FIG. 2b is a diagram illustrating the computation of disc overhead for the prior art catamaran air bearing slider shown in FIG. 2a.

FIG. 3b is a diagram illustrating the computation of disc surface efficiency for the prior art Chhabra air bearing slider shown in FIG. 3a.

FIG. 4a is a schematic diagram of the air bearing slider of the present invention shown at an inner most radius and an outer most radius of a disc surface.

FIG. 4b is a diagram illustrating the computation of disc overhead for the air bearing slider of the present invention shown in FIG. 4a.

FIG. 5b is a section view taken along line 5b—5b of the air bearing slider of FIG. 5a.

FIG. 6b is a sectional view taken along line 6b—6b of the air bearing slider of FIG. 6a.

FIG. 7 is a bottom plan view of a fourth alternative embodiment of the air bearing slider of the present invention.

FIG. 8 is a bottom plan view of a fifth alternative embodiment of the air bearing slider of the present invention.

FIG. 9 is a bottom plan view of a sixth alternative embodiment of the air bearing slider of the present invention.

FIG. 10 is a bottom plan view of a seventh alternative embodiment of the air bearing slider of the present invention.

DETAILED DESCRIPTION OF THE PREFERRED EMBODIMENTS

Figure 1B:
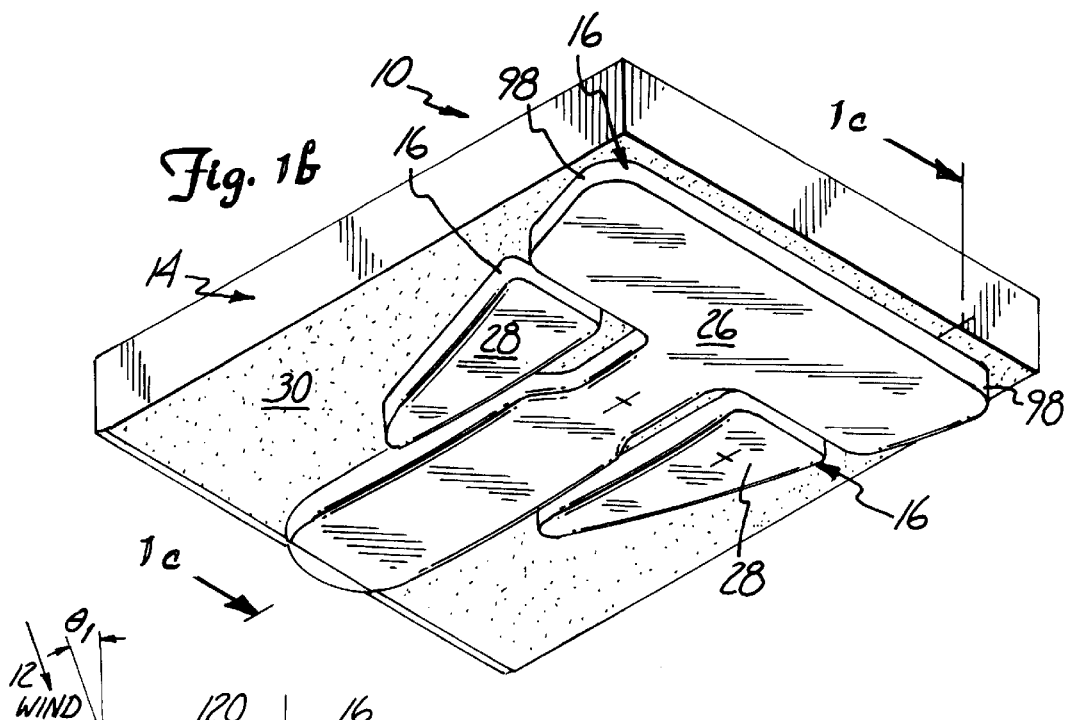

FIGS. 1a, 1b, 1c, and 1d show a slider 10 of the present invention.

The slider 10 flies in a wind 12 or pressurized air that is produced by the rotation of a magnetic disc surface (not shown) positioned below the slider 10. The direction of the wind 12 relative to the slider 10 is dependent on, among other things, the slider's radial position over the disc surface as will be discussed in more detail later. The slider 10 includes a slider body 14, a raised air bearing portion 16, and a transducer 18. The raised air bearing portion 16 interacts with the wind 12 to maintain a desired spacing between the magnetic disc surface and the transducer 18.

The portion 16 has a leading edge 20 and a trailing edge 22 relative to the direction of disc rotation. The leading edge 20 has a width substantially greater than a width of the trailing edge portion 22 of the raised air bearing portion 16. The raised air bearing portion 16 defines a triangle 24 with the base of the triangle at the leading edge 20 and the vertex of the triangle 24 near the trailing edge 22. In one preferred embodiment, the triangle defining the outer periphery of the raised air bearing portion 16 is an isosceles triangle with the vertex of the triangle centered at the trailing edge 22. The raised air bearing portion 16 includes a T-shaped portion 26 and side portions 28 positioned on either side of T-shaped portion 26.

Figure 1A:
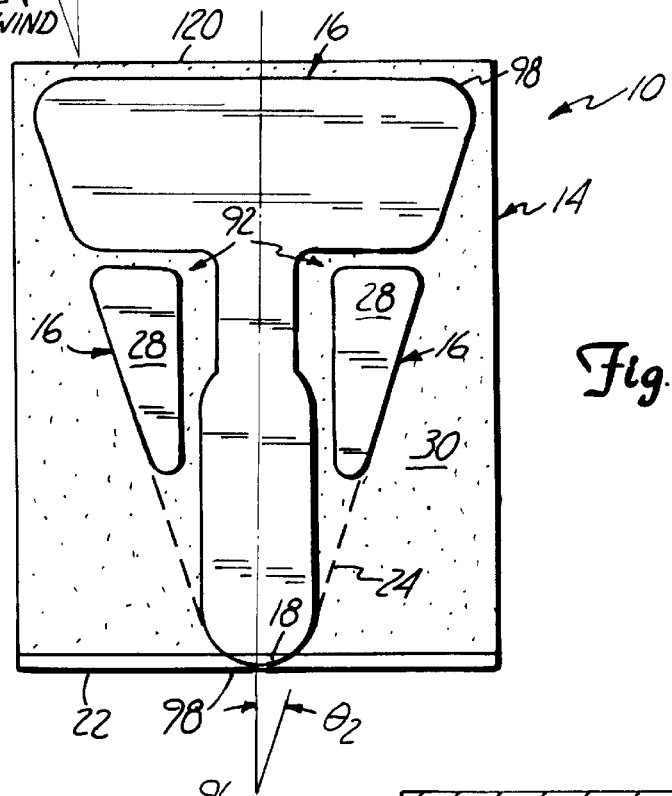
FIG. 1a is a bottom plan view of an air bearing slider of the present invention.
Figure 1C:
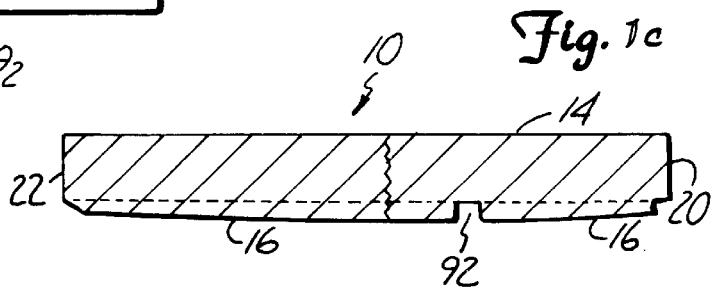
FIG. 1c is a sectional view of the air bearing slider of FIG. 1a taken across line 1c—1c.

As shown in FIGS. 1b and 1c, the raised air bearing portion 16 extends from a bottom surface 30 of the slider body 14. This raised air bearing portion 16 extends in a range from 100 micro inches to 1000 micro inches above the bottom surface 30. In one preferred embodiment, the raised air bearing portion 16 flies at a height of 5 micro inches and is cylindrically crowned to reduce wear and friction during lift-off of the slider 10 from the disc surface. The crowning of the raised air bearing portion 16 will be discussed in more detail later.

Figure 1D:
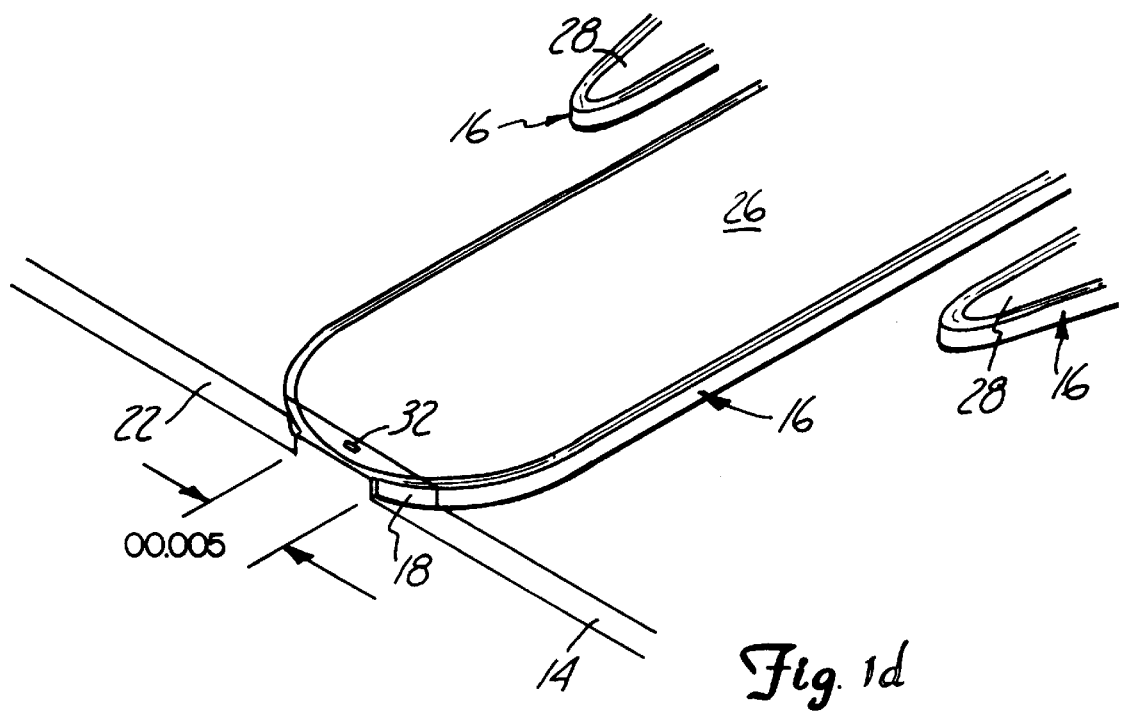

As shown in FIG. 1d, the transducer 18 is positioned at the trailing edge 22 of the raised air bearing portion 16. In one preferred embodiment, the transducer 18 is a thin film transducer having pole tips 32 positioned central on the trailing edge 22 of the raised air bearing portion 16. Thin film transducers 18 are known.

One aspect of the present invention is the overall shape of the raised air bearing portion 16 in conjunction with a centrally located transducer 18 that allows efficient use of disc space thereby maximizing storage capacity of the disc storage device. The following examples illustrate the disc usage efficiency of two prior art sliders and compare this disc efficiency to the slider of the present invention shown in FIGS 1a, 1b, 1c, and 1d. It can be seen from these examples that these two prior art sliders require more disc overhead and therefore make less efficient use of disc space than the slider of the present invention.

Figure 2A:
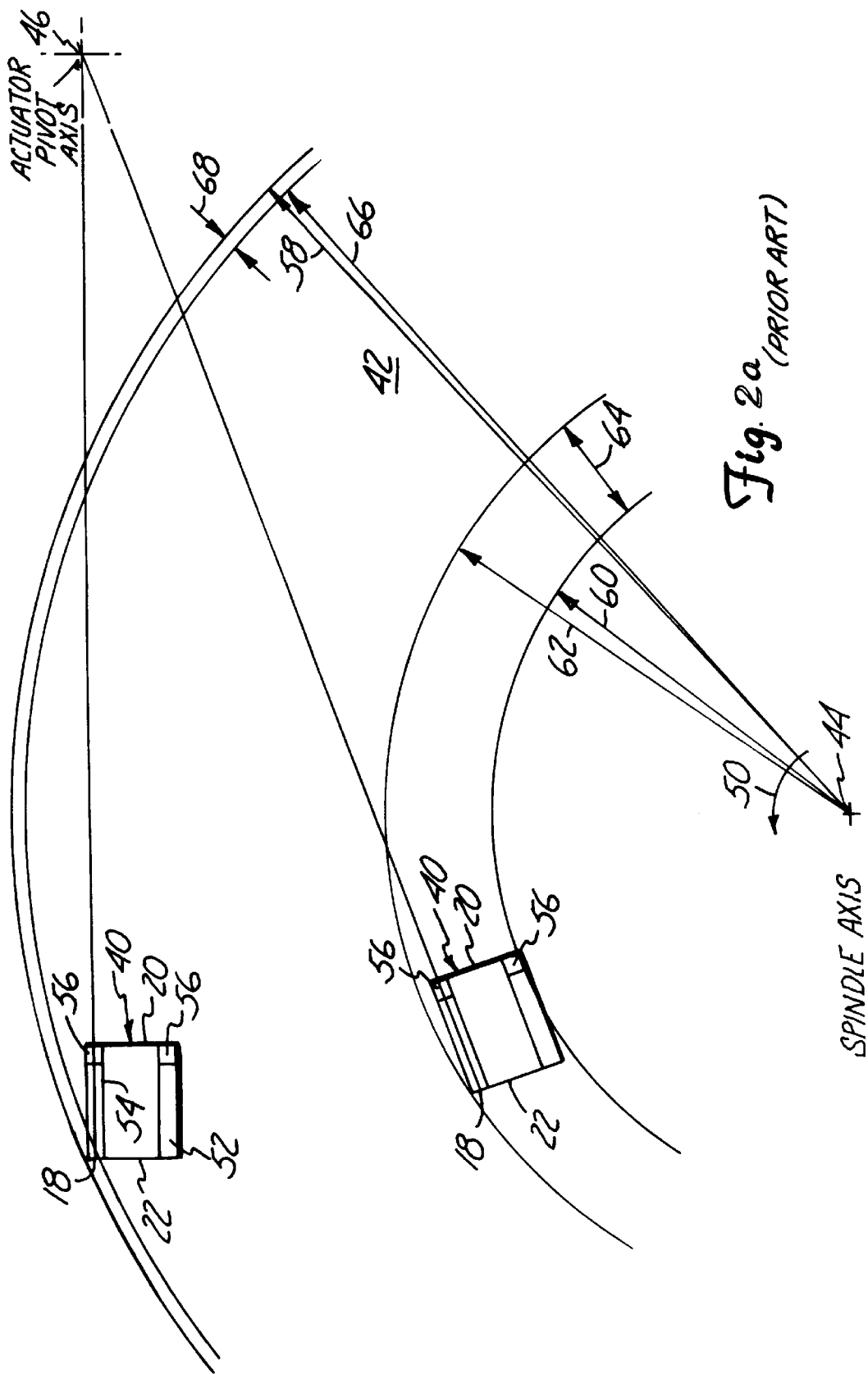
FIG. 2a is a schematic diagram of a prior art catamaran air bearing slider shown at an inner most radius and an outer most radius of a disc surface.
Figure 2B:
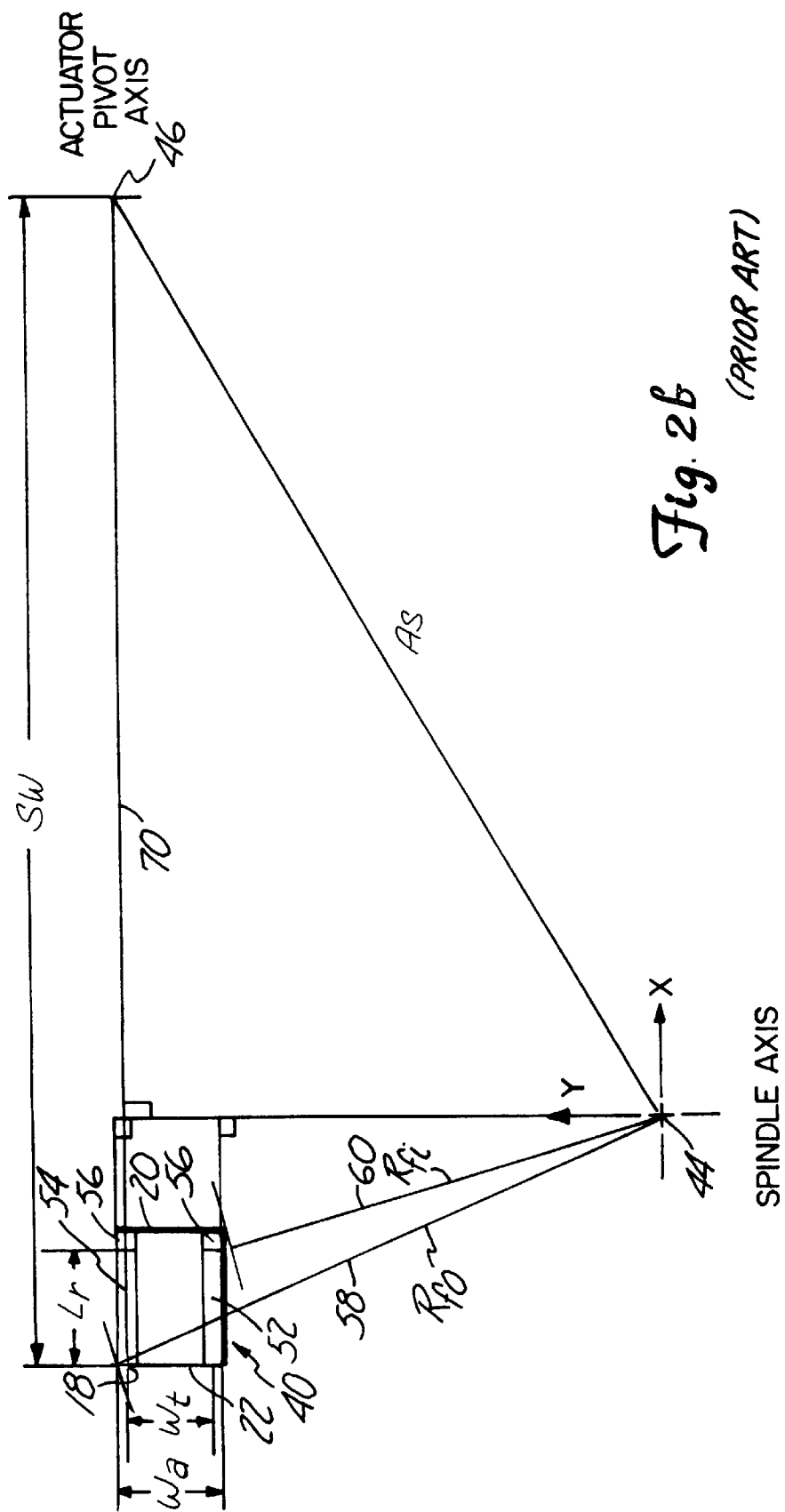
Figure 3A:
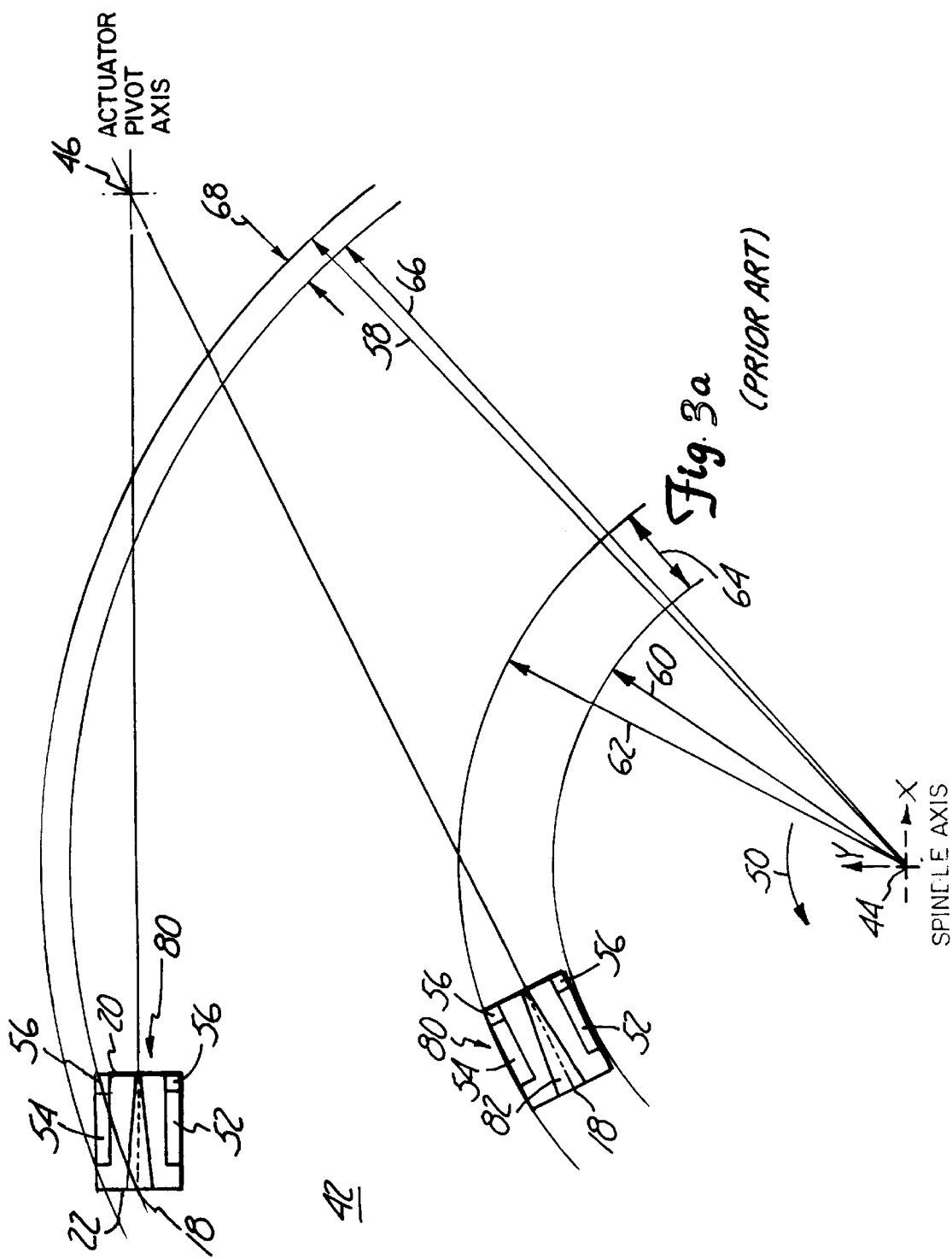
FIG. 3a is a schematic diagram of a prior art Chhabra air bearing slider shown at an inner most radius position and an outer most radius position of a disc surface.
Figure 3B:
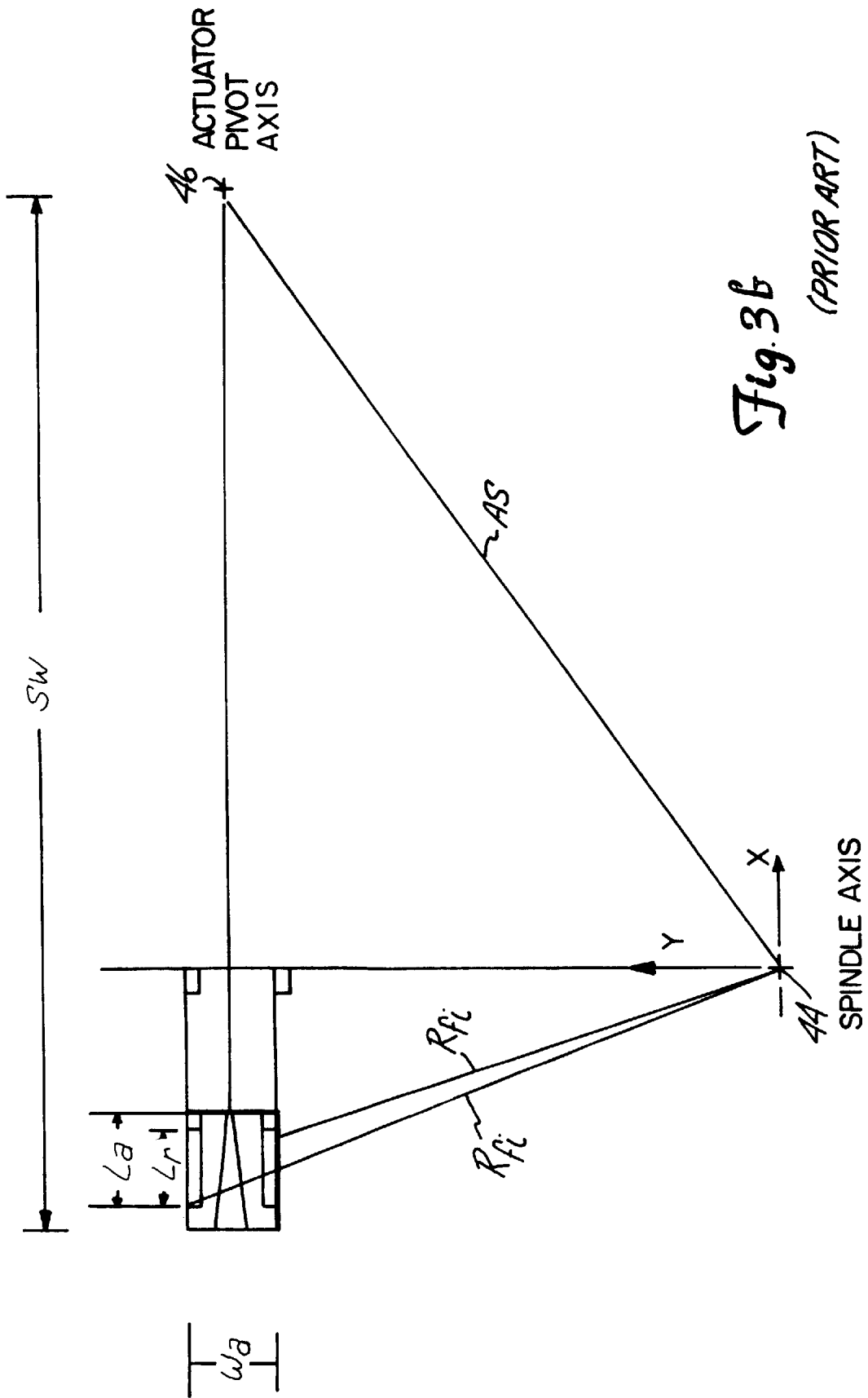
Figure 4B:
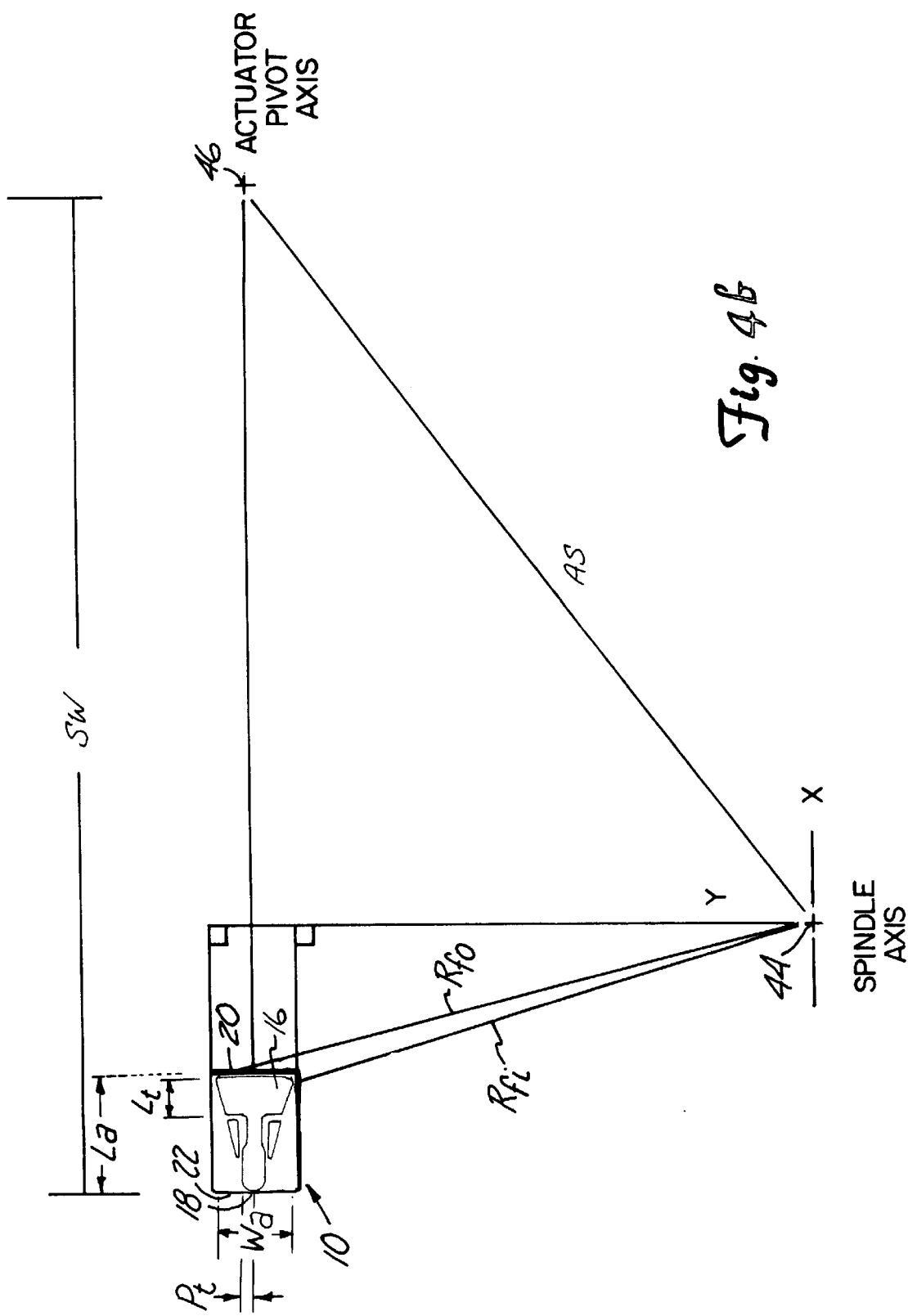

The first of these two prior art sliders shown in FIGS. 2a and 2b is a taper flat catamaran-type slider described in U.S. Pat. No. 5,136,445 to Zak, assigned to the assignee of the present invention, incorporated herein by reference. The second of these prior art sliders as shown in FIGS. 3a and 3b is a slider disclosed in U.S. Pat. No. 4,894,740 to Chhabra et al., incorporated herein by reference. FIGS. 2a, 2b and 3a, 3b are used to illustrate disc overhead for the catamaran slider and the Chhabra slider, respectively. FIGS. 4a and 4b disclose the disc overhead for slider 10 of the present invention.

Each of these examples illustrating disc overhead are based on a "typical" 2½ inch (65 millimeter) disc drive. This typical 2½ inch disc drive includes a rotary actuator for positioning the slider over the disc surface. The distance between the transducer and pivot point of the actuator is 1.426 inches. The distance between the actuator pivot axis and the axis of rotation of the rotating magnetic media is 1.466 inches. The specified "outer flyable radius" designated in $R_{fo}$ of the rotating magnetic media is 1.200 inches. Finally, the specified "inner flyable radius" designated $R_{fi}$, of the rotating magnetic media is 0.600 inches. Table 1 shows relevant slider dimensions and dimensions of the 2½ disc drive that will be used to determine disc overhead for each of these sliders.

TABLE 1

TYPICAL 65 MM Disc DRIVE

| | |
|---|---|
| Outer "flyable" radius ($R_{fo}$) | 1.200 inches |
| Inner "flyable" radius ($R_{fi}$) | 0.600 inches |
| Transducer gap to actuator pivot distance (SW) | 1.426 inches |
| Actuator pivot to spindle axis distance (AS) | 1.466 inches |
| Transducer of slider tangent to the arc of motion | |
| TYPICAL 50 SERIES TAPER-FLAT CATAMARAN AS DESCRIBED IN ZAK | |
| Rail length (leading taper to trailing edge) ($L_r$) | 0.070 inches |
| Slider ABS width ($W_a$) | 0.058 inches |
| Transducer spacing ($W_t$) | 0.048 inches |
| TYPICAL 50 SERIES ABS AS DESCRIBED IN CHHABRA | |
| ABS length (leading taper to trailing edge) ($L_a$) | 0.070 inches |
| Rail length (leading taper to end of rail) ($L_4$) | 0.052 inches |
| Slider ABS width ($W_a$) | 0.058 inches |
| AIR BEARING SLIDER 10 OF THE PRESENT INVENTION | |
| ABS length (outer corner of base to vertex) ($L_r$) | 0.075 inches |
| Slider ABS width ($W_a$) | 0.058 inches |
| Gap to triangle side distance ($D_t$) | 0.010 inches |

The following is a derivation disc utilization efficiency of the taper flat catamaran described in Zak and shown in FIGS. 2a and 2b. As shown in FIG. 2a, a taper flat catamaran 40 of the type shown in Zak is positioned at both an inner radius position and at an outer radius position on a rotatable magnetic media 42 having an axis of rotation 44. The taper flat catamaran slider 40 is positioned by an actuator arm (not shown) that pivots about an actuator pivot axis 46. Similar numbering will be used to identify structures similar to the slider 10 of the present invention.

The catamaran slider 40 has a leading edge 20 and a trailing edge 22 relative to a direction of rotation of the magnetic media 42 indicated by an arrow 50. The catamaran slider 40 includes an inner air bearing surface or rail 52 and an outer air bearing surface or rail 54 relative to the axis of rotation 44 of the rotatable magnetic media 42. A taper 56 is provided for the leading edge 20 of each of the inner and outer air bearing surfaces 52 and 54, respectively. The transducer 18 is located centrally on the trailing edge 22 of the outer air bearing surface 54.

Disc overhead is the result of portions of the magnetic disc 42 between an outer flyable radius 58 and an inner flyable radius 60 that is either not suitable for data storage, as in the case of the landing zone, or the transducer cannot be positioned over these portions of the disc, as in the case of disc overhead adjacent the outer flyable radius.

A portion of the disc 42 adjacent the inner flyable radius or landing zone is often used as a dedicated portion of the disc 42 that the slider drags across when the rotating magnetic disc 42 has insufficient velocity to provide a cushion of air to support the slider 40. The slider drags across this portion referred to as a landing zone when the disc is brought up to speed during power on and when the disc slows down during power off.

The landing zone is defined by the portion of disc 42 between the inner flyable radius 60 and an outer radius of the landing zone 62. The outer radius of the landing zone 62 is defined as the radial distance between the disc axis of rotation 44 and an outermost portion of the landing zone. For the catamaran slider 40, the outermost radius of the landing zone is defined by an outer trailing corner of the outer air bearing surface 54 when slider 40 is positioned with an inner leading corner of air bearing surface 52 positioned at the inner flyable radius 60. The difference between the outer radius of the landing zone 62 and the inner flyable radius 60 is the disc overhead due to the landing zone 64.

The disc overhead adjacent the outer flyable radius 58 results from the inability to position transducer 18 over a portion of the disc surface adjacent the outer flyable radius 58. This disc overhead adjacent the outer flyable radius 58 is defined as the portion of disc 42 between the outer flyable radius 58 and an outermost radius of the recording zone 66. The outermost radius of the recording zone 66 is the radial distance from the axis of rotation 44 to transducer 18 with slider 40 positioned so that the outer trailing corner of the outer air bearing surface 54 is positioned at the outer flyable radius 58. This outermost radius of the recording zone 66 is subtracted from the outer flyable radius 58 to yield an outer disc overhead 68.

The illustration in FIG. 2b is used to calculate the outer radius of the landing zone 62 and the outermost radius of the recording zone 66 so that disc overhead can be computed for the catamaran slider 40. This diagram shows the catamaran-type slider 40 positioned relative to the disc axis of rotation 44 and the actuator pivot axis 46. The analysis makes use of a cartesian coordinate system positioned at the axis of rotation 44 with the x axis parallel to a line 70 extending between the actuator pivot axis 46 and the transducer 18. The diagram of FIG. 2b represents the slider 40 positioned at the inner flyable radius 60 for the computation of the outer radius of the landing zone 62. This same diagram also represents the slider 40 positioned at the outer flyable radius 58 for the computation of the outermost radius of the recording zone 66. Both the outer radius of the landing zone 62 and the outermost radius of the recording zone 66 are used to compute the total disc overhead for the catamaran slider 40.

The disc overhead due to the landing zone 64 requires only the determination of the outer radius of the landing zone 62 because the inner flyable radius 60 is specified in Table 1. A right triangle is formed having a hypotenuse defined by the disc axis of rotation 44 and the actuator pivot axis 46. The length of this hypotenuse or actuator pivot to spindle axis distance AS is given in Table 1 as 1.466 inches. Based on the Pythagorean theorem, an equation can then be written relating the length of the sides of this right triangle to the hypotenuse. This equation can be represented as follows:

$$(X_t+SW)^2+Y_t^2=AS^2 \quad (1)$$

Where $X_t$ and $Y_t$ are variables representing the X and Y coordinates respectively of the transducer 18 and SW represents the distance from transducer 18 to the actuator pivot axis 46.

A second right triangle is defined by the inner flyable radius 60. A second equation based on the transducer 18 coordinates ($X_t$, $Y_t$) and the relationship between the lengths of the sides to the hypotenuse of this right triangle shown as follows:

$$(X_t+L_r)^2+(Y_t-W_t-\tfrac{1}{2}(W_a-W_t))^2=R_{fi}^2 \quad (2)$$

Where $L_r$ is the rail length or length between the leading taper 56 to trailing edge 22, $W_t$ is the spacing between the transducer 18 positioned centrally at the trailing edge of the outer air bearing surface 54 and an unused transducer positioned centrally at the trailing edge of the inner air bearing surface 52, $W_a$ represents the width of the air bearing surface, and $R_{fi}$ represents the inner flyable radius. Each of the following dimensions $L_r$, $W_a$ and $W_t$ are shown in FIG. 2b and tabulated in Table 1. Substituting values from Table 1, 1.426 inches for SW and 1.466 inches for AS, into Equation 1 yields the following equation:

$$(X_t+1.426)^2+(Y_t)^2=1.466^2 \quad (3)$$

Substituting values from Table 1, 0.048 inches for $W_t$, 0.058 inches for $W_a$, 0.600 inches for $R_{fi}$ and 0.070 inches for $L_r$, in Equation 2 yields the following equation:

$$(X_t+0.070)^2+(Y_t-0.048-\tfrac{1}{2}(0.058-0.048))^2=(0.6000)^2 \quad (4)$$

Equations 3 and 4 are two equations having two unknowns, $X_t$, and $Y_t$. Equations 3 and 4 are solved for $X_t$ and $Y_t$, which represents the coordinates of the transducer 18 when the slider 40 is positioned at the inner flyable radius 60.

An Equation can then be written for the outer radius of the landing zone 62 which is the distance from the disc spindle 44 to the outer trailing corner of outer air bearing surface 54 of slider 40 when the slider is positioned at the inner flyable radius 60. This equation represents the relationship between the lengths of the sides to the length of the hypotenuse of a right triangle whose hypotenuse defines the outer radius of the landing zone 62. Similar to the previous equations, the following equation is based on the sum of the squares of the lengths of the sides of the right triangle is equal to the length of the hypotenuse squared. This equation can be represented as follows:

$$R_1^2=X_t^2+(Y_t+\tfrac{1}{2}(W_a-W_t))^2 \quad (5)$$

Solving equation 5 for $R_1$ and substituting 0.058 inches for the slider width $W_a$ and 0.048 inches for the transducer spacing $W_t$ from Table 1 yields the following:

$$R_1^2=\sqrt{(X_t)^2+\left(Y_t+\frac{1}{2}(.058-.048)\right)^2} \quad (6)$$

Substituting the values for $X_t$ and $Y_t$ from the solution to equations 3 and 4 yields a outer radius of the landing zone that is equal to 0.6661 inches.

Subtracting the inner flyable radius 60 which equals 0.600 inches from the outer landing zone radius 62 which equals 0.6661 inches yields 0.06661 inches as the disc overhead resulting from the landing zone 64.

In a similar manner, the outer disc overhead 68 shown in FIG. 2a can be computed by determining the outermost radius of the recording zone 66. Similar to the previous example where the outer landing zone radius 62 was determined in determining the outermost radius of the recording zone 66, two equations can be written having two unknowns. The first equation is the same relationship shown in Equation 1. The second equation is based on a similar relationship between the lengths of the sides of a right triangle to its hypotenuse. In this case, however, the hypotenuse is now the outer flyable radius 58 instead of the inner flyable radius 60 used in the previous computation. FIG. 2b illustrates this relationship with the hypotenuse represented by the outer flyable radius 58 instead of the inner flyable radius 60 used in the previous case. The equation for the outer flyable radius 58 is as follows:

$$Xt_t^2+(Y_t+\tfrac{1}{2}(W_a-W_t))^2=R_{fo}^2 \quad (7)$$

Where $X_t$ and $Y_t$ are variables that represent the (X, Y) coordinates of the transducer 18, similar to the previous case, except the slider 40 is positioned at the outer flyable radius 58 instead of the inner flyable radius 60. $W_a$ represents the slider width of 0.058 inches, $W_t$ represents the transducer spacing of 0.048 inches and $R_{fo}$ represents the outer flyable radius 58 which equals 1.200 inches, each from Table 1. Equations 1 and 7 can then be solved for $X_t$, $Y_t$. The outermost radius of the recording zone 66 is then the distance from the spindle axis 44 to the coordinates of the transducer which are represented by ($X_t$, $Y_t$). Therefore, the following equation can be written for the length of the outermost radius of the recording zone 66 in terms of the transducer 18 (X, Y) coordinates as follows:

$$R_{do}^2=X_t^2+Y_t^2 \quad (8)$$

Where $R_{do}$ is equal to the outer most radius of the recording zone 66 in inches.

Solving Equation 8 for $R_{do}$ yields the following equation:

$$R_{do}=\sqrt{X_t^2+Y_t^2} \quad (9)$$

Substituting the values of $X_t$ and $Y_t$ from the solution to equations 1 and 7 yields an outer most radius of the recording zone 66 that is equal to 1.1954 inches.

Therefore, the outer disc overhead 68, which is equal to the difference between the outer flyable radius and the outermost radius of the recording zone 66, is equal to 0.0046 inches.

The total disc overhead for the catamaran-type slider 40 is equal to the sum of the disc overhead due to the landing zone 64 and the outer disc overhead 68 which is equal to 0.0707 inches.

An analysis of disc overhead for a slider 80 disclosed in U.S. Pat. No. 4,894,740, Chhabra incorporated herein by reference, is shown in FIGS. 3a and 3b. Similar numbering will be used to identify similar structures in both the Chhabra slider 80 and the catamaran slider 40 previously analyzed for disc overhead. FIG. 3a is a bottom view of the Chhabra slider 80 positioned on a disc surface 42 having an axis of rotation 44. The slider 80 is positioned using a rotary actuator (not shown) which pivots about a central pivot axis 46 to position the slider between an inner flyable radius 60 designated $R_{fi}$ and an outer flyable radius 58 designated $R_{fo}$ relative to the axis of rotation 44 of the magnetic disc 42.

The Chhabra slider 80 includes a leading edge 20 and a trailing edge 22 relative to a direction of rotation 50 of the disc 42. The slider 80 includes an inner air bearing surface or rail 52, an outer air bearing surface or rail 54 and a central air bearing surface or rail 82. A tapered surface 56 is provided at the leading edge of each of the inner air bearing surface 52 and the outer air bearing surface 54. Positioned centrally at the trailing edge 22 of the central air bearing surface 82 is a transducer 18.

The outer radius of the landing zone 62, designated $R_l$, is the distance from the axis of rotation 44 to the outer trailing corner of the outer air bearing surface 54 when slider 80 is positioned such that the inner leading corner of the inner air bearing surface 52 is positioned at the inner flyable radius 60 designate $R_{fi}$. The landing zone overhead is then the difference between the outer radius of the landing zone 62 and the inner flyable radius 60.

The outermost radius of the recording zone 66 designated $R_{do}$ is defined as the distance from the axis of rotation 44 to transducer 18 with the slider 80 positioned such that the outer trailing corner of the outer air bearing surface 54 is positioned at the outer flyable radius 58 designate $R_{fo}$. The disc overhead 68 adjacent the outer flyable radius 58 ($R_{fo}$) is then the difference between the outer flyable radius 58 and the outermost radius of the recording zone 66 ($R_{do}$).

An illustration showing the computation of the outer radius of the recording zone 66 ($R_{do}$) and the outer radius of the landing zone 62 ($R_l$) is shown in FIG. 3b. The analysis begins with the determination of the outer radius of the landing zone 62 ($R_l$). Two equations can be written that relate the lengths of the sides of a right triangle to the hypotenuse of the triangle. This first triangle is defined by a hypotenuse that extends between the spindle axis 44 and the actuator pivot 46 designated AS. The relationship between the sides of this triangle and the hypotenuse is shown in equation 1.

A second equation can be written for the right triangle defined by the hypotenuse portion that defines the inner flyable radius 60 ($R_{fi}$) of disc 42. This equation can be written as follows:

$$(X_t + L_n)^2 + (Y_t - \tfrac{1}{2} W_a)^2 = R_{fi}^2 \tag{10}$$

Where $L_a$ represents the length of the air bearing surface which equals 0.070 inches, $W_a$ represents the slider width that equals 0.058 inches and $R_{fi}$ represents the inner flyable radius 60 that equals 0.600 inches shown in Table 1. Each of the dimensions $W_a$, $L_a$ and $L_r$ are shown on FIG. 3b and tabulated in Table 1. Solving the simultaneous equations 1 and 10 for variables $X_t$ and $Y_t$ yields the coordinates of the transducer 18 with the slider 80 positioned so that the inner leading corner of the inner air bearing surface 52 is positioned at the inner flyable radius 60.

The following equation can then be written for the outer radius of the landing zone 62 ($R_l$) in terms of the transducer 18 position when the slider 80 is positioned at the inner flyable radius 60, this equation is a follows:

$$R_l^2 = (X_t + L_a - L_r)^2 + (Y_t + \tfrac{1}{2} W_a)^2 \tag{11}$$

Where $L_r$ represents the rail length which equals 0.052 inches from Table 1. Solving equation 11 for $R_l$ and substituting the transducer coordinates ($X_t$, $Y_t$) from the solution of equations 1 and 10 yields an outer radius of the landing zone 62 ($R_l$) that is equal to 0.6624 inches.

Therefore, the inner disc overhead 64 resulting from the landing zone is the difference between the outer radius of the landing zone 62 and the inner flyable radius 60 is equal to 0.0624 inches.

The disc overhead at the outer flyable radius 58 ($R_{fo}$) is determined for the Chhabra slider 80 in a manner similar to the analysis of the catamaran-type slider 40. First the outermost radius of the recording zone 66 ($R_{do}$) is determined by writing two equations based on the relationship of the length of the sides of a right triangle to the length of the hypotenuse. These equations involve variables $X_t$ and $Y_t$ representing the (X,Y) coordinates of the transducer 18 with slider 80 positioned such that the outer trailing corner of the outer air bearing surface 54 is positioned at the outer flyable radius 58 ($R_{fo}$).

The first of these equations is shown in equation 1 which represents a triangle having a hypotenuse extending between the spindle axis 44 and the actuator pivot 46. A second equation representing a triangle having a hypotenuse extending between the spindle axis 44 and the outer trailing corner of outer air bearing surface 54 of slider 80 can be represented as follows:

$$(X_t + L_a - L_r)^2 + (Y_t + \tfrac{1}{2} W_a)^2 = R_{fo}^2 \tag{12}$$

Substituting values for $L_a$, $L_r$, $W_a$, $R_{fo}$, SW and AS from Table 1 and solving equations 1 and 12 for $X_t$ and $Y_t$ yields the coordinates of the transducer 18 when the slider is positioned at the outer flyable radius 58.

The distance from the spindle axis 44 to the transducer (X, Y) which coordinates with the slider positioned at the outer flyable radius can be determined from Equation 9. Solving equation 9 for the outer most radius of the recording zone 66 ($R_{do}$) yields 1.1797 inches.

The disc overhead at the outer flyable radius can be determined by subtracting the outermost radius of the recording zone 66 ($R_{fo}$) which equals 1.1797 inches from the outer flyable radius 58 ($R_{fo}$) which equals 1.200 inches yielding 0.02030 inches as the disc overhead for the outer flyable radius.

The total disc overhead is then the sum of the disc overhead at the inner flyable radius which equals 0.0624 and the disc overhead at the outer flyable radius which equals 0.02030 inches yielding 0.0827 total disc overhead for the Chhabra slider 80.

The disc overhead for the slider 10 of the present invention shown in FIGS. 1a, 1b; , and 1c is determined in a manner similar to the computation of disc overhead for the catamaran slider 40 and the Chhabra slider 80. The disc overhead for slider 10 of the present invention is illustrated in FIG. 4a and the computation of a disc overhead is illustrated in FIG. 4b.

FIG. 4a is a bottom view of slider 10 of the present invention positioned on a disc surface 42 having an axis of rotation 44. The slider 10 is positioned using a rotary actuator (not shown) which pivots about a central pivot axis 46. To position the slider 10 between an inner flyable radius 60 ($R_{fi}$) and an outer flyable radius 58 ($R_{fo}$) relative to the axis of rotation 44 of the magnetic disc 42.

The outer radius of the landing zone 62 ($R_l$) is the distance from the axis of rotation 44 to the outer leading corner of the raised air bearing portion 16 when the slider 10 is positioned such that the inner leading corner of the air bearing surface 16 is positioned at the inner flyable radius 60 ($R_{fi}$). The overhead due to the landing zone is then the difference between the outer radius of the landing zone 62 ($R_{fi}$) and the inner flyable radius 60 ($R_{fi}$).

The outer radius of the landing zone 60 $R_{fi}$ can be found by determining the coordinates ($X_t$, $Y_t$) of the transducer 18 when the slider 10 is positioned adjacent the inner flyable radius 60 ($R_{fi}$). Again, the (X, Y) coordinates of the transducer 18 is determined by writing simultaneous equations in terms of $X_t$ and $Y_t$. Each of these equations are based on the relationship between each of the sides of a right triangle to the hypotenuse.

The first of these equations is shown in Equation 1, which is based on the right triangle shown in FIG. 3b having a hypotenuse that extends between the disc axis of rotation 44 and the actuator pivot axis 46 designated AS.

The second equation in terms of the length of the inner flyable radius $R_{fi}$ and the coordinates ($X_t$, $Y_t$) of transducer 18 can be written as follows:

$$(X_t+L_r)^2+(Y_t-\tfrac{1}{2}W_a)^2=R_{fi}^2 \qquad (13)$$

Where $L_r$ is the length (leading edge to trailing edge) of the raised air bearing portion 16 of slider 10 which equals 0.075 inches, $W_a$ represents the width (inner edge to outer edge) of the raised air bearing surface 16 of slider 10 which is equal to 0.058 inches and $R_{fi}$ represents the inner flyable radius 60 which equals 0.600 inches, as shown in Table 1.

The coordinates of the transducer 18 when slider 10 is positioned adjacent the inner flyable radius $R_{fi}$ can be determined by solving simultaneous Equations 1 and 13.

An equation can then be written for the length of the outer radius of the landing zone 60 ($R_l$) in terms of the length, $L_r$, and width, $W_a$, of slider 10 and the (X, Y) coordinates of the transducer 18 as follows:

$$R_l^2=(X_t+L_r)^2+(Y_t+\tfrac{1}{2}W_a)^2 \qquad (14)$$

Solving Equation 14 for $R_l$ and substituting values for $X_t$ and $Y_t$ from the solution to Equations 1 and 13 and substituting 0.075 inches for $L_r$ and 0.058 for $W_a$ from Table 1 yields an outer radius of the landing zone that is equal to 0.6579 inches.

The disc overhead due to the landing zone is then the difference between the outer radius of the landing zone 60 ($R_l$) and the inner flyable radius 60 ($R_{fi}$) which yields 0.0671 inches of disc overhead.

Next, the disc overhead 68 shown in FIG. 4a that is adjacent the outer flyable radius 58 ($R_{fo}$) is determined by calculating the outermost radius of the recording zone 66 ($R_{do}$) and subtracting this value from the outer flyable radius 58 ($R_{fo}$) The outermost radius of the recording zone for slider 10 is determined in a manner similar to the computation used for the catamaran slider 40 and the Chhabra slider 80. Simultaneous equations can be written for the right triangle shown in FIG. 3b in terms of the (X, Y) coordinates of transducer 18 when the slider 10 is positioned with the outer portion of the trailing edge of raised air bearing surface 16 at the outer flyable radius 58 ($R_{fo}$).

The first of these simultaneous equations represents the right triangle having a hypotenuse represented by the distance between the disc axis of rotation 44 and the actuator pivot axis 46. This equation is shown in Equation 1 where the transducer 18 to actuator pivot axis 46 distance (SW) from Table 1 is 1.426 inches, the disc axis of rotation 44 to actuator pivot axis 46 distance (AS) is 1.466 inches from Table 1.

A second equation relating the lengths of the sides of a right triangle to the hypotenuse of that triangle which involves the (X, Y) coordinates of transducer 18, the outer flyable radius 58 ($R_{fo}$) and the distance between the transducer 18 and the trailing edge of the raised air bearing surface 16, this equation can be written as follows:

$$(X_t+D_t)^2+Y_t^2=R_{fo}^2 \qquad (15)$$

Where $R_{fo}$ is 1.200 inches and $D_t$ is 0.010 inches from Table 1. Solving simultaneous equations 1 and 15 yields the coordinates of the transducer 18 when the slider 10 is positioned at the outer flyable radius 58 ($R_{fo}$)

An equation can then be written for the distance from the disc axis of rotation 44 to the outermost radius of the recording zone 66 ($R_{do}$) based on the transducer 18 coordinates $X_t$ and $Y_t$ from the solution of Equations 1 and 15. This equation is shown in Equation 9. Substituting $X_t$ and $Y_t$ from the solution to Equations 1 and 15 yields an outermost radius of the recording zone 66 ($R_{do}$) that is equal to 1.1908 inches.

Therefore, the disc overhead adjacent the outer flyable radius 58 is the difference between the outer flyable radius 58 ($R_{fo}$) which equals 1.2000 inches and the outermost radius of the recording zone 66 ($R_{do}$) which equals 1.1908 inches or 0.0092 inches of disc overhead.

The total disc overhead for slider 10 of the present invention is the sum of the disc overhead due to the landing zone 64 which equals 0.0579 inches plus the disc overhead 68 adjacent the outer flyable radius 58 ($R_{fo}$) which equals 0.0092 inches for a total disc overhead of 0.0671 inches.

A summary of disc overhead for each of slider 10 of the present invention, the catamaran slider 40, and the Chhabra slider 80 is shown in Table 2.

TABLE 2

|  | Slider 10 of Present Invention | Catamaran Slider 40 | Chhabra Slider 80 |
| --- | --- | --- | --- |
| Disc overhead due to landing zone (inches) | .0579 | .0661 | .0624 |
| Disc overhead adjacent outer flyable radius (inches) | .0092 | .0046 | .02030 |
| Total disc overhead (inches) | 0.0671 | 0.0707 | .0827 |

As can be seen from Table 2, the slider 10 of the present invention makes more efficient use of disc space, thereby requiring less total disc overhead than either the catamaran slider 40 or the Chhabra slider 80. Although the comparison of disc overhead shown in Table 2 is for a specific actuator configuration and disc size, it is apparent that the slider 10 provides similar disc efficiency advantage for a wide range of actuator configurations and disc sizes as well.

Another aspect of the slider 10 of the present invention is the slider's tendency not to collect contamination from the disc surface. Contamination, when collected by a slider, may tend to unite or combine, forming larger contaminants. These larger contaminants, when dislodged from the slider, may damage either the slider or the disc surface while passing through the air bearing or spacing between the slider and disc surface. Furthermore, as these larger contaminants are dislodged from the slider, they may disrupt the slider-to-disc spacing. If this disruption is sufficiently large, the slider can damage the disc surface or cause a catastrophic failure such as head crash.

One feature of the slider 10 of the present invention which tends to prevent contaminants from accumulating on the slider 10 is a continuous raised air bearing portion 16 toward the leading edge 20 of the T-shaped portion 26 shown in FIGS 1a, 1b, and 1c. This continuous raised air bearing portion 16 tends to prevent contaminants from becoming lodged at this leading edge of the raised air bearing portion 16. In one preferred embodiment the leading edge of the air bearing surface 16 is blended or radiused.

Another feature of the slider 10 of the present invention which tends to prevent contamination from accumulating on the slider is a taper provided along the sides of the raised air bearing surface 16 from the leading edge 20 to the trailing edge 22. Sliders that are used with rotary actuators are positioned at varying angles with respect to the direction of disc rotation as the slider moves over the recording surface. This angular orientation is referred to as the "skew" angle. Skew angle is generally discussed in U.S. Pat. No. 4,870,519 to White, incorporated herein by reference. As the skew angle becomes increasingly large relative to the rotation of the disc, the wind 12 which as an instantaneous velocity that is approximately that of a local velocity vector of the disc surface tends to approach slider 10 at a correspondingly increasing angle of incidence or skew angle represented by the angle $\theta_1$, in FIG. 1a. As wind 12 approaches slider 10 at an increasing larger angle of incidence $\theta_1$, the greater the opportunity for contaminants carried by this wind to become lodged or collected in any depressions or channels 92 along the sides of the raised air bearing surface 16.

The slider 10 of the present invention makes use of tapered sides along the raised air bearing portion 16 from the leading edge 20 to the trailing edge 22 to minimize wind carried contaminants from being lodged along the sides of the raised air bearing surface 16 when the slider 10 is flying at relatively large skew angles $\theta_1$. In one preferred embodiment, the raised air bearing surfaces 16 are tapered at an angle $\theta_2$ with respect to the central axis 90 of the raised air bearing portion 16 where $\theta_2$ is equal to or greater than the angle of incidence $\theta_1$, of wind 12. In this manner, contaminants are less likely to be carried into the channels 92 by the wind 12.

In addition, the side portions 28 of raised air bearing surface 16 limit access to the channels 92 of slider 10 thereby tending to prevent contamination carried on wind 12 from accumulating on slider 10. The side portions 28 can be formed in a variety of shapes to limit access to channels 92 of the slider 10 from contaminants carried in wind 12.

Another feature of the slider 10 of the present invention is that any chipping of the slider body 14 that may occur during manufacture tends not to affect the air bearing surface 16 because this surface is set well inside the outside edges that define the slider body. Because the slider body 14 tends to be made from materials that are prone to chipping such as aluminum-oxide and titanium-carbide, the slider body 14 and, in particular, the corner edges where two planes intersect are prone to chipping. Chips or defects in the slider body can tend to collect contamination which tends to decrease the reliability of the disc drive. In addition, chipping of the slider body during slider manufacture can damage the air bearing surface necessitating the slider 10 be scrapped which reduces manufacturing yield. Chipping which results in damage to the air bearing surface is particularly a problem for slider designs in which an air bearing surface is formed along the edge of the slider body such as shown in the catamaran slider 40 or the Chhabra slider 80. For these sliders chips or damage to the slider body can more easily damage the outer rails or air bearing surfaces resulting in reduced manufacturing yield. In contrast, the raised air bearing surfaces 16 of slider 10 of the present invention are well recessed from the corners of the slider body 14 and are therefore less likely to be damaged by chipping during the manufacture of the sliders.

Another aspect of the slider 10 of the present invention is that the raised air bearing surface 16 is symmetric about the central axis 96 with the transducer 18 mounted on this central axis. Because of this symmetry the slider 10 can be mounted to head gimbal assemblies on either the top surface or the bottom surface of the disc 42.

Another feature of slider 10 of the present invention is that the wide air bearing surface 16 toward the leading edge 20 of this air bearing surface provides good lift characteristics at relatively low rotation speeds of the magnetic media. These lift characteristics allow the air bearing slider 10 to lift quickly off the disc surface during start up thereby minimizing damage to the disc surface and the slider. More specifically, the wider leading edge 20 of air bearing surface 16 than the trailing edge 22 of this air bearing surface provides high lift characteristics at low disc speeds.

Additionally, slider 10 is capable of flying at a high "fly" slope which tends to reduce the stiction and wear of the slider during start up. The fly slope or pitch is a measure of the difference in flying height of the leading edge 20 over the trailing edge 22 for the slider. A high fly slope is necessary in order to ensure that the transducer 18 is positioned near the disc surface on a slider having a lengthwise crown on the air bearing surface 16. The relationship between fly slope, crown height, and rail length can be represented by the following equation:

$$\text{Fly Slope} = \frac{4C}{L} \quad (16)$$

Where C represents the crown height in inches and L represents the rail length in inches.

The use of a high lengthwise crown on the raised air bearing surface 16 provides improved wear and stiction performance of the slider. Stiction is the result of a water film between the slider and the magnetic disc. The thickness of this water film is assumed to be about 0.4 micro inches. Test data taken from sliders with crown heights as little as 1 micro inch exhibit significant wear and stiction performance over sliders with no crown. These tests tend to indicate that the thickness of the water film between the head and the disc is less than 1 micro inch.

Therefore, if the aspirates on the slider are separated from the aspirates on the disc by more than the thickness of the water under surface tension, then water will not collect on the asperities.

It is desirable that the stiction due to water film surface tension is kept relatively low. The force required to overcome the surface tension of a water film is given by the following equation:

$$F_{ST} = \frac{2A\gamma\cos\alpha}{h} \quad (17)$$

Where $F_{ST}$ is the normal force to overcome surface tension. A represents the total area of the water film, gamma is the surface tension of water, X is the angle of wetting of the water film, and h is the thickness of the water film. Therefore, as the crown height is increased the length of the air bearing surface susceptible to stiction due to water film surface tension decreases as the total area for water to form a film is decreased.

At very low disc rotation rates the slider tends to both slide and shear the water film. For the slow disc speeds the use of a high crown is beneficial because it tends to reduce the area of water being sheared thereby lowering the shear force as shown by the following equation:

$$F_{SHEAR} = \frac{uAv}{h} \quad (18)$$

Where $F_{SHEAR}$ is the tangential force resisting viscosity, u in the viscosity of water, A represents the area of the water film, v represents the relative velocity between the slider and disc, and h is the thickness of the water film.

Relatively high crown heights tend to improve the stiction performance of the slider. The height of the crown selected is related to the profile of the crown. Assuming a parabolic crown profile, then the crown height is related to the slider length by the following relationship:

$$\text{Crown Height} = (\text{constant}) (\text{Half the slider length})^2 \quad (19)$$

Where the slider length is the length of the air bearing surface of the slider. As a result of the crown only a portion of the air bearing surface along the length of the slider is susceptible to stiction. The length of the air bearing surface susceptible to stiction is related to the film thickness and crown height by the following relationship:

$$\text{slider length susceptible to stiction} = \text{air bearing surface length} \sqrt{\frac{\text{film thickness}}{\text{crown height}}} \quad (20)$$

Assuming the slider has an air bearing surface having a length of 0.080 inches, the length of the air bearing surface susceptible to stiction can be evaluated for varying crown heights. It can be seen from Table 3 that for crown heights that are greater than 5 micro inches the marginal returns diminish. Although the benefit of increases in crown height are realized even for crown heights in the range from 0 to 1 micro inch. it is desirable to have at least one micro inch of crown height for improved stiction performance in high humidity conditions.

TABLE 3

| Crown Height | Susceptible ABS Length |
|---|---|
| "0" | 0.0800 |
| .4 | 0.0800 |
| 1 | 0.0506 |
| 2 | 0.0358 |
| 3 | 0.0292 |
| 4 | 0.0253 |
| 5 | 0.0226 |
| 6 | 0.0207 |
| 7 | 0.0191 |
| 8 | 0.0179 |
| 9 | 0.0169 |
| 10 | 0.0160 |

Another feature of the slider 10 of the present invention is a relative insensitivity to fly roll. Fly roll results from a nonuniformed distribution of pressurized air beneath the air bearing surfaces as a result of slider skew. This nonuniformed distribution of air gives rise to a nonuniformity in fly height between the inner and outer portion of the slider resulting in slider roll. Slider roll is a much greater concern for both sliders that have a transducer that is mounted at the trailing edge on either side of the central axis of the slider or sliders having a relatively wide air bearing surface. For these sliders, a small change in fly roll angle creates relatively large changes in the head-to-disc separation at the trailing edges of each rail. In contrast, slider 10 of the present invention has a trailing edge width for the air bearing surface that is relatively small. Therefore a relatively large fly roll angle is required so that an appreciable change in trailing edge head-to-disc separation occurs. Although the slider 10 has a leading edge width that is similar to the catamaran slider 40, the large head-to-disc separation at the leading edge due to the large fly slope allows relatively large fly roll angles to be accommodated.

Another advantage of slider 10 of the present invention that is related to the slider is relative insensitivity to fly roll is that the slider 10 is also relatively insensitive to an external roll moment created when a flexure load point is offset from the slider's longitudinal center line. The flexure load point is the location on the slider where the load beam supplies the force that counteracts the lifting force provided by the air bearing. This load point is typically offset from the center line 96 of the slider in order to place the rail or air bearing surface with the active transducer at a location of minimum head-to-disc separation at all disc radii. Therefore, sliders having transducers that are positioned off the center line 96 require head gimbal assemblies that are manufactured for flying on the top surface of the disc be assembled on tooling that is different from that used on head gimbal assemblies intended for the bottom surface of the disc. Because the slider 10 of the present invention has a centrally mounted transducer, there is no need for load point offset. This provides greater ease in manufacturing because a common flexure and assembly tooling can be used on head gimbal assemblies that are intended for either the top disc surface or the bottom disc surface. In addition, the elimination of load point offset greatly simplifies the design steps needed to determine the exact configuration of the air bearing surface and its alignment to the flexure.

Slider 10 of the present invention is relatively insensitive to slider body strains. These slider body strains are created by expansion or contraction of the flexing that is adhesively attached to the slider. An example of such a flexure is disclosed in copending patent application Ser. No. 07/975,352, filed Nov. 12, 1992 to Tracy M. Hagen, inventor of the present invention and assigned to the assignee of the present invention, and incorporated herein by reference. Because the raised air bearing surface 16 at the trailing edge 22 is relatively narrow in width, any strain applied by the flexure to the slider body 30 produces little distortion to the air bearing surface 16. Therefore, the head gimbal assembly can be manufactured with relatively few change and deformation problems resulting in more consistent fly height performance in operation.

The slider 10 of the present invention makes use of generously radiused edges 98 along the corners of the raised air bearing surface 16 to minimize damage to the disc surface in the event of contact. In one preferred embodiment, the raised corners of the air bearing surface 16 have a radius in a range of 0.01 to 0.10 times the length of the slider 10. The generously radiused edges 98 at the corners at the trailing end 22 of raised air bearing surface 16 tends to minimize damage to the disc surface as the trailing end of the slider is dragged during disc start up. In addition, the gently radiused edges 98 at the raised air bearing surface 16 may contact the disc surface when the disc drive is not in use if a sufficient shock is applied. Because the disc substrate is made of a relatively soft material such as aluminum and the slider 10 is made from a extremely hard material such as aluminum oxide titanium carbide, the slider will impress itself into the disc surface if sufficient shock is applied. The disc surface is coated with a very thin and very hard magnetic metal film. This metal film membrane is stretched when contacted by the slider. Sliders having a generally rectangular shaped air bearing surface will tend to puncture through the film membrane at the corners of the slider which are points of high film stress. However, the use of gently radiused edges 98 on the raised air bearing surfaces 16 tend to minimize the membrane film stress and therefore minimize damage to the disc surface in the event of severe shock to the disc storage device.

Another important aspect of the slider 10 of the present invention is the ease in which the head disc separation is measured during manufacturing testing, thereby improving the throughput of fly testing. The flying height of the head is regarding as one of the most critical head attributes, and it is quite common to test every head gimbal assembly for flying height. The flying height test generally is performed by loading the head against the spinning glass disc having very low roughness, and in such a way that the head is at a particular radius and skew angle that is representative of how the head will be situated in the disc drive. White light then produces colored interference fringes, also known as Newton's rings, between the air bearing surface and the spinning glass disc. A unique spectral signature is associated with different flying heights, which can then be calculated in a known manner.

Typical catamaran sliders such as slider 40 require the fly height to be determined at four points, these are the leading and trailing edges of each rail. In contrast, slider 10 of the present invention requires only the height of the trailing edge to be determined, thereby reducing the measurement time and throughput of the fly height testing.

Shown in FIGS. 5a, 5b, 6a, 6b, 7, 8, 9, and 10 are alternative embodiments of the slider 10 of the present invention. Similar numbering is used in these figures to identify structures that are similar to slider 10.

Figure 5A:
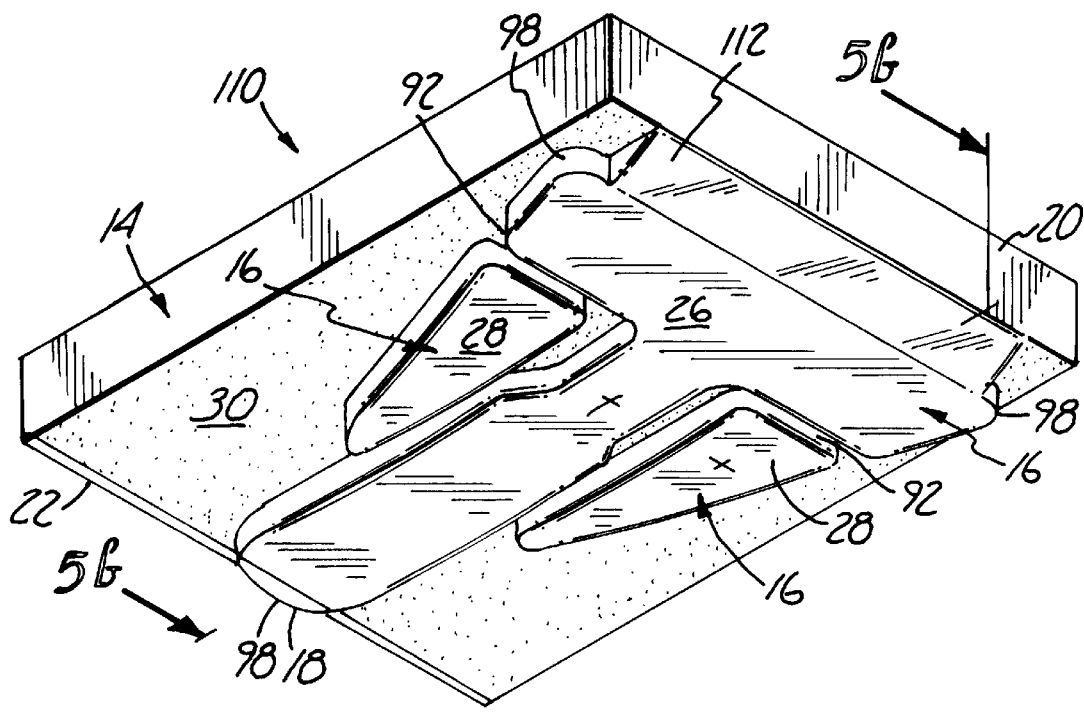
FIG. 5a is a perspective view of a bottom surface of second alternative embodiment of the air bearing slider of the present invention.
Figure 5B:
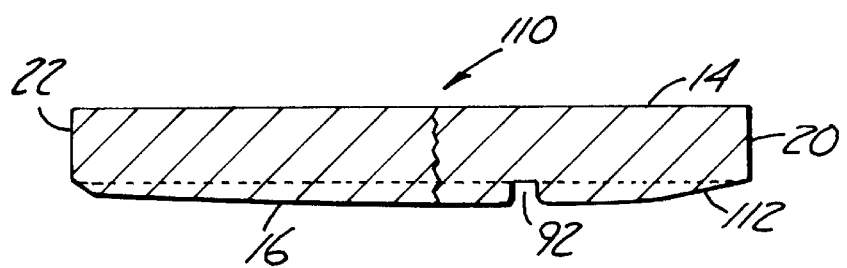

A first alternative embodiment of the slider 10 of the present invention is shown in FIGS. 5a and 5b. Slider 110 is similar to slider 10 shown in FIGS. 1a, 1b, and 1c with the addition of a leading edge taper 112 for providing additional lift. The leading edge taper 112 is similar to taper 56 shown on the catamaran slider 40 in FIGS. 2a and 2b and taper 56 shown on the Chhabra slider 80 in FIGS. 3a and 3b.

The slider 110 includes a slider body 10, a raised air bearing portion 16, and a transducer 18. The raised air bearing portion 16 includes a T-shaped portion 26 and side portions 28 positioned on either side of the T-shaped portion 26. The raised air bearing portion 16 extends from a bottom surface 30 to define a triangular shape with the base of the triangle at the leading edge 20 and the vertex of the triangle centered on the trailing edge 22.

Slider 110 makes use of generously radiused edges 98 along the corners of the raised air bearing surface 16 to minimize damage to the disc surface in the event of contact. As shown in FIG. 5a, the width of the leading edge taper 112 as measured tangential to the leading edge 20 is less than the width of the leading edge of the T-shaped portion 26 of the raised air bearing surface 16. Generously radiused edges 98 provides a smooth transition from a leading edge of raised air bearing surface 16 to a side edge of that same air bearing surface.

Tolerances in the manufacturing process can result in misregistration or misalignment between the tapered leading edge 112 and the raised air bearing surface 16. The use of edge blending, however, provides a substantial amount of smoothing of any irregularities that may result from this misregistration. More specifically, the use of edge of blending provides smoothing of any irregularities in the inner section of two planes that define the end of the leading edge taper 112. In addition, edge blending may be used to smooth any irregularities between the alignment of the end of the leading edge taper 112 and corner radii of the radiused edges 98 that are positioned towards the leading edge 20.

Figure 6A:
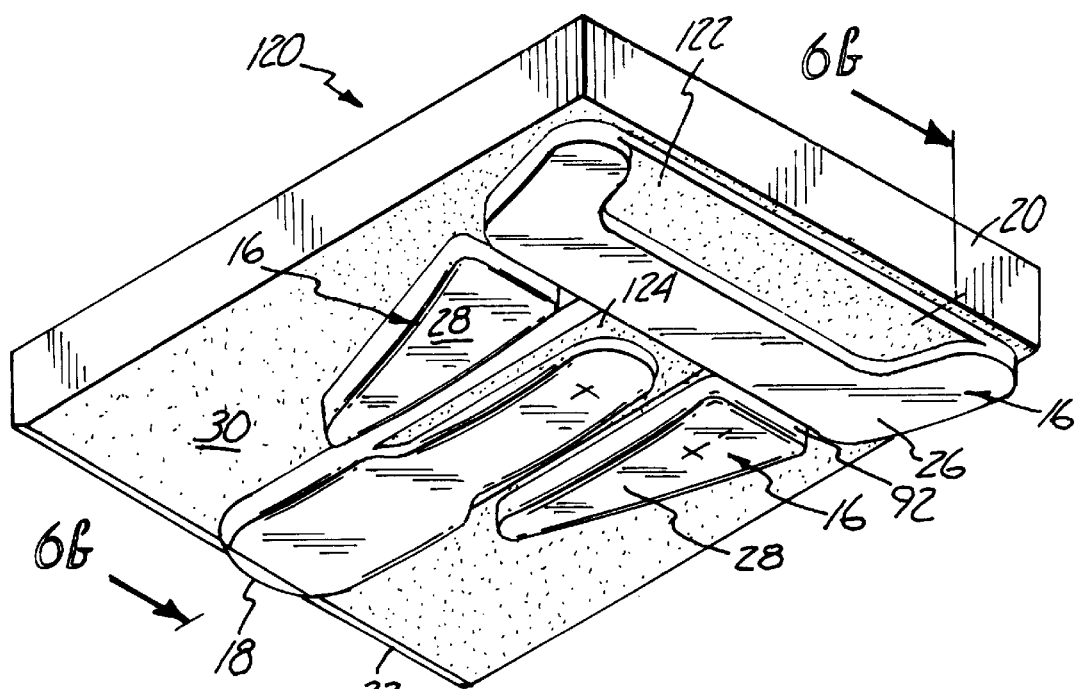
FIG. 6a is perspective view of a bottom surface of a third alternative embodiment of the air bearing slider of the present invention.
Figure 6B:
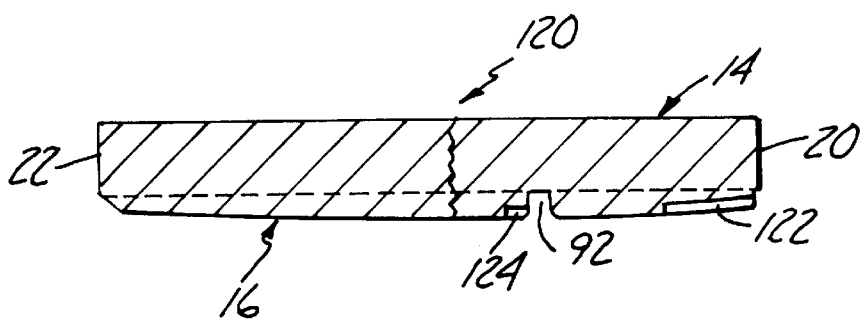

Slider 120, as shown in FIGS. 6a and 6b, is a second alternative embodiment of the slider 10 of the present invention. Similar numbering is used for slider 120 to designate structures that are similar to slider 10 previously discussed. Slider 120 is similar to slider 10 except for the addition of a shallow depression 122 toward a leading edge 20 of a T-shaped portion 26 of a raised air bearing surface 16. Another difference between slider 120 and slider 10 is a second depression 124 towards the central portion of the T-shaped raised air bearing surface 26. The first depression 122 extends across approximately ¾ of the width of the raised air bearing surface 16 in a direction normal to the leading edge 20. This first depression provides a means for collecting and pressurizing air toward the leading edge 20 of slider 120. The second depression 124 is positioned along the central or upright portion of the T-shaped raised air bearing portion 26 which extends towards the trailing edge 22 of the slider 120. This second depression 124 tends to depressurize air towards the trailing end 22 of the slider 120. This depressurization or lowering of the pressure towards the trailing edge 22 reduces the fly height of the slider 120 at the trailing end 22.

In one preferred embodiment, both of the first and second depressions 122 and 124, respectively, are formed using an ion milling process. In this preferred embodiment, each of the first and second depressions 122, and 124 are milled to a depth of 10 microns below the raised air bearing surface 16.

A third alternative embodiment of the air bearing slider 10 of the present invention is slider 130 shown in FIG. 7. Similar numbering is used to identify similar structures. Slider 130 is similar to slider 10 shown in FIGS. 1a, 1b, and 1c except that the side portions 28 of the raised air bearing portion 16 have been omitted. The slider 130 includes a slider body 14 and a T-shaped raised air bearing surface 26. The T-shaped raised air bearing portion 26 includes a transducer 18 positioned centrally at a trailing edge 22. The T-shaped raised air bearing portion 26 defines a triangle 24 with the base of the triangle toward a leading edge 20. Each of the corners of the T-shaped raised air bearing surface 26 include a radius 98 at each of the corners.

Slider 140 shown in FIG. 8 is a fifth alternative embodiment of slider 10 of the present invention. The slider 140 has an air bearing surface 16 that is raised from a surface 30 of a slider body 14. The air bearing surface 16 includes a leading edge portion 142 positioned adjacent a leading edge 20 and a trailing edge portion 144 having an elongated shape and extending toward a trailing end 22 of the slider body 14. The leading portion 142 has a width measured along the leading edge 20 that is greater than a width of the trailing edge portion 144. The differential and width between the leading edge portion 142 and the trailing edge portion 144 provides high lift for the slider 140.

Slider 150 shown in FIG. 9 is a fifth alternative embodiment of the slider 10 of the present invention. Slider 150 includes a slider body 14 having a leading edge 20 and a trailing edge 22. A raised air bearing surface 16 extends from a surface 30 of the slider body 14. The raised air bearing surface 16 generally forms a triangle 24 with the base of the triangle adjacent the leading edge 20 and the vertex of the triangle adjacent the trailing edge 22. A transducer 18 is mounted centrally at the trailing edge 22 of the slider 150.

The raised air bearing surface 16 includes a central portion 152 and a pair of side portions 154 and 156, mounted on either side of the center portion 152. The side portions 154 and 156 are generally triangular shaped with the wider portion oriented toward the leading edge 20. The central portion 152 has a narrow portion 158 that is positioned between the leading edge 20 and trailing edge 22 of the central portion 152. This narrow portion 158 is used to control the fly height versus disc radius relationship for slider 150.

A slider 160 is shown in FIG. 10 that is a sixth alternative embodiment for slider 10 of the present invention. The slider 160 includes a slider body 14 having a raised air bearing surface 16 that extends from a surface 30.

The raised air bearing surface 16 includes first and second leading edge portions 162 and 164, respectively, and trailing portion 166. The leading edge portions 162 and 164 are triangularly shaped with the base of the triangle adjacent the leading edge 20 of slider 160. The trailing portion 166 is positioned between each of the leading edge portions 162 and 164 and the trailing edge 122. The leading edge portions 162, 164 and the trailing edge portion 166 together form a triangle 24 having a based adjacent the leading edge 20 and a vertex centered at the trailing edge 22.

The corners of each of the leading surfaces 162 and 164 and the trailing surface 166 are generously radiused to minimize damage to the disc surface in the event of contact.

The slider 10 of the present invention makes use of an air bearing surface 16 that is greater in width toward the leading edge than the trailing edge. This overall tapered shape of the air bearing surface together with a centrally mounted transducer at the trailing edge 22 allows slider 10 to efficiently utilize disc space when used with a rotary actuator. In addition, the raised air bearing surface 16 tends not to collect or trap contaminants which can, if dislodged, produce damage to the disc surface. The slider 10 of the present invention also provides good fly characteristics.

Although the present invention has been described with reference to preferred embodiments, workers skilled in the art will recognize that changes may be made in form and detail without departing from the spirit and scope of the invention.

What is claimed is:

1. An air bearing slider for supporting a transducer proximate a rotating disc, the slider comprising:

a slider body having a nominally planar leading edge and a nominally planar trailing edge relative to motion of the rotating disc, the slider body having a bottom surface between the leading edge and the trailing edge; and a raised portion formed on the bottom surface defining an air bearing surface that interacts with incident air to support the slider in close proximity to the rotating disc, the air bearing surface having a leading edge portion and a trailing edge portion with the leading edge portion positioned proximate the leading edge of the slider body and having a leading edge width as measured parallel to the nominal plane of the leading edge of the slider body and with the trailing edge portion positioned proximate and central with respect to the trailing edge of the slider body and having a trailing edge width as measured parallel to the nominal plane of the trailing edge of the slider body that is less than that of the leading edge width, the air bearing surface defining a central longitudinal axis extending between the leading edge portion and the trailing edge portion, the raised portion comprising at least a first extending portion extending on the central longitudinal axis, the first extending portion being defined by a single peripheral wall which intersects the bottom surface, the first extending portion providing at least part of the air bearing surface of the air bearing slider, the first extending portion beginning at the leading edge of the air bearing slider, the air bearing surface of the first extending portion having a leading width, a trailing width, and a middle width between the leading width and trailing width that is smaller than both the leading width and the trailing width.

2. An air bearing slider for supporting a transducer proximate a rotating media disc, the air bearing slider comprising:

a slider body having a leading edge and a trailing edge, the slider body having a bottom surface between the leading edge and the trailing edge; and a raised portion formed on the bottom surface defining an air bearing surface that interacts with incident air to support the air bearing slider in close proximity to the rotating media disc, the air bearing surface having an outer periphery which generally has a triangular shape, with a front side of the triangular shape positioned along the leading edge and a rear corner of the triangular shape positioned along trailing edge, wherein the raised portion comprises a first extending portion which extends along a central axis of the air bearing surface, the first extending portion being defined by a first single peripheral wall which intersects the bottom surface, the first extending portion providing at least part of the air bearing surface of the air bearing slider, the first extending portion beginning at the leading edge of the air bearing slider, the air bearing surface of the first extending portion having a leading end, a trailing end, and a portion of reduced width between the leading end and the trailing end, the portion of reduced width being smaller than both the leading end and trailing end.

3. The air bearing slider of claim 2 wherein the raised portion further comprises a second extending portion, the second extending portion being defined by a second single peripheral wall which intersects the bottom surface, the second extending portion providing at least part of the air bearing surface of the air bearing slider.

4. The air bearing slider of claim 2 wherein the first extending portion is symmetric about the central axis of the air bearing surface.

5. An air bearing slider for supporting a transducer proximate a rotating media disc, the air bearing slider comprising:

a slider body having a leading edge and a trailing edge, the slider body having a bottom surface between the leading edge and the trailing edge; and a raised portion formed on the bottom surface defining an air bearing surface that interacts with incident air to support the air bearing slider inclose proximity to the rotating media disc, the air bearing surface having an outer periphery which generally has a triangular shape, with a front side of the triangular shape positioned along the leading edge and a rear corner of the triangular shape positioned along the trailing edge, wherein the raised portion comprises a first extending portion which extends along a central axis of the air bearing surface, the first extending portion being defined by a first single peripheral wall which intersects the bottom surface, the first extending portion providing at least part of the air bearing surface of the air bearing slider, the air bearing surface of the first extending portion having a leading end, a trailing end, and a portion of reduced width between the leading end and the trailing end;

wherein the raised portion further comprises a second extending portion, the second extending portion being defined by a second single peripheral wall which intersects the bottom surface, the second extending portion providing at least part of the air bearing surface of the air bearing slider;

wherein the raised portion further comprises a third extending portion, the third extending portion being defined by a third single peripheral wall which intersects the bottom surface, the third extending portion providing at least part of the air bearing surface of the air bearing slider, the air bearing surfaces of the second and third extending portions being right triangles spaced on opposite sides of the first extending portion, and wherein each of the right triangles has a hypotenuse and two legs, the hypotenuses of the two right triangles forming a portion of the outer periphery of the air bearing surface.

6. The air bearing slider of claim 5 wherein one of the legs of each of the right triangles have a leg which provides a portion of the leading edge of the air bearing surface.

7. The air bearing slider of claim 5 wherein the second extending portion and the third extending portion are spaced on opposite sides of the first extending portion.

8. An air bearing slider for supporting a transducer proximate a rotating media disc, the air bearing slider comprising:

a slider body having a leading edge and a trailing edge, the slider body having a bottom surface between the leading edge and the trailing edge; and a raised portion formed on the bottom surface defining an air bearing surface that interacts with incident air to support the air bearing slider in close proximity to the rotating media disc, the air bearing surface having an outer periphery which generally has a triangular shape, with a front side of the triangular shape positioned along the leading edge and a rear corner of the triangular shape positioned along the trailing edge, wherein the raised portion comprises a first extending portion which extends along a central axis of the air bearing surface, the first extending portion being defined by a first single peripheral wall which intersects the bottom surface, the first extending portion providing at least part of the air bearing surface of the air bearing slider, the air bearing surface of the first extending portion having a leading end, a trailing end, and a portion of reduced width between the leading end and the trailing end;

wherein the raised portion further comprises a second extending portion, the second extending portion being defined by a second single peripheral wall which intersects the bottom surface, the second extending portion providing at least part of the air bearing surface of the air bearing slider;

wherein the first extending portion is T-shaped, with a top of the T-shape providing the front side of the triangular shape and an upright portion of the T-shape extending from the top toward the trailing edge, and wherein a depression positioned along the upright portion defines the portion of reduced width, the depression being shallower than a full height of the first single peripheral wall.

9. An air bearing slider for supporting a transducer proximate a rotating media disc, the air bearing slider comprising:

a slider body having a leading edge and a trailing edge, the slider body having a bottom surface between the leading edge and the trailing edge; and a raised portion formed on the bottom surface defining an air bearing surface that interacts with incident air to support the air bearing slider in close proximity to the rotating media disc, the air bearing surface having an outer periphery which generally has a triangular shape, with a front side of the triangular shape positioned along the leading edge and a rear corner of the triangular shape positioned along the trailing edge, wherein the raised portion comprises a first extending portion which extends along a central axis of the air bearing surface, the first extending portion being defined by a first single peripheral wall which intersects the bottom surface, the first extending portion providing at least part of the air bearing surface of the air bearing slider, the air bearing surface of the first extending portion having a leading end, a trailing end, and a portion of reduced width between the leading end and the trailing end, wherein the first extending portion is T-shaped, with a top of the T-shape providing the front side of the triangular shape and an upright portion of the T-shape extending from the top toward the trailing edge, and wherein the top includes a depression on the central axis, the depression being shallower than a full height of the first single peripheral wall.

10. The air bearing slider of claim 9, wherein the depression extends across about ¾ of the front side.

11. An air bearing slider for supporting a transducer proximate a rotating media disc, the air bearing slider comprising:

a slider body having a leading edge and a trailing edge, the slider body having a bottom surface between the leading edge and the trailing edge; and a projecting portion formed on the bottom surface defining an air bearing surface that interacts with incident air to support the air bearing slider in close proximity to the rotating media disc, wherein the raised portion comprises a first extending portion, the first extending portion being defined by a single peripheral wall which intersects the bottom surface, the first extending portion providing at least part of the air bearing surface of the air bearing slider, the air bearing surface of the first extending portion extending substantially full width across the slider body, the air bearing surface of the air bearing slider having a central axis, and wherein a front side of the first extending portion includes a depression on the central axis extending at least half but less than full width across the leading edge, the depression being shallower than a full height of the first single peripheral wall.

12. The air bearing slider of claim 11, wherein the air bearing surface of the air bearing slider has an outer periphery which generally has a triangular shape.

13. The air bearing slider of claim 11, wherein the depression extends approximately ¾ width of the front side.

14. The air bearing slider of claim 13 wherein the air bearing surface is symmetric about the central axis.

15. The air bearing slider of claim 14, wherein the first extending portion is T-shaped, with a top of the T-shape providing the front side and an upright portion of the T-shape extending from the top along the central axis toward the trailing edge.

16. The air bearing slider of claim 15, wherein the air bearing surface of the first extending portion has a portion of reduced width between the top and a trailing end.

17. The air bearing slider of claim 16, wherein the portion of reduced width is provided by a second depression of the first extending portion positioned along the upright portion of the T-Shape, the second depression being shallower than a full height of the first single peripheral wall.

18. An air bearing slider for supporting a transducer proximate a rotating media disc, the air bearing slider comprising:

a slider body having a leading edge and a trailing edge, the slider body having a bottom surface between the leading edge and the trailing edge; and a raised portion formed on the bottom surface defining an air bearing surface that interacts with incident air to support the air bearing slider in close proximity to the rotating media disc, wherein the raised portion comprises a first extending portion, the first extending portion being defined by a single peripheral wall which intersects the bottom surface, the first extending portion providing at least part of the air bearing surface of the air bearing slider, the air bearing surface of the first extending portion extending substantially full width across the slider body, the air bearing surface of the air bearing slider having a central axis, and wherein a front side of the first extending portion includes a first depression on the central axis extending less than full width across the leading edge, the first depression being shallower than a full height of the single peripheral wall, the first depression extending approximately ¾ width of the front side, the air bearing surface being symmetric about the central axis, wherein the first extending portion is T-shaped, with a top of the T-shape providing the front side and an upright portion of the T-shape extending from the top along the central axis toward the trailing edge, the air bearing surface of the first extending portion having a portion of reduced width between the top and a trailing end, the portion of reduced width being provided by a second depression of the first extending portion positioned along the upright portion of the T-shape, the second depression being shallower than a full height of the first single peripheral wall, wherein the raised portion further comprises at least two additional extending portions, all of the extending portions cumulatively providing the air bearing surface with an outer periphery which generally has a triangular shape, with a rear corner of the triangular shape positioned along the trailing edge at the central axis, wherein the two additional extending portions are right triangles spaced on opposite sides of the portion of reduced width, and wherein each of the right triangles has a hypotenuse, the hypotenuses of the two right triangles forming a portion of the outer periphery of the air bearing surface.

\* \* \* \* \*

UNITED STATES PATENT AND TRADEMARK OFFICE
CERTIFICATE OF CORRECTION

PATENT NO. : 5,923,499
DATED : JULY 13, 1999
INVENTOR(S) : TRACY M. HAGEN

It is certified that error appears in the above-identified patent and that said Letters Patent is hereby corrected as shown below:

Col. 7, line 20, delete "$X_{t9}$", insert --$X_t$--

Col. 20, line 57, delete "inclose", insert --in close--

Col. 22, line 39, delete "projecting", insert --raised--

Signed and Sealed this

First Day of February, 2000

*Attest:*

Q. TODD DICKINSON

*Attesting Officer*     Acting Commissioner of Patents and Trademarks